US009784927B2

(12) United States Patent
Lambourn et al.

(10) Patent No.: US 9,784,927 B2
(45) Date of Patent: *Oct. 10, 2017

(54) INDICATING COMMUNICATIONS COMPONENTS VIA ILLUMINATION

(71) Applicant: CommScope Connectivity UK Limited, Swindon, Wiltshire (GB)

(72) Inventors: Stephen Lambourn, Swindon (GB); Ai Ling Xu, Shanghai (CN); Alan Cook, Liverpool (GB); Ian Miles Standish, Flintshire (GB)

(73) Assignee: CommScope Connectivity UK Limited (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/240,657

(22) Filed: Aug. 18, 2016

(65) Prior Publication Data

US 2017/0045696 A1 Feb. 16, 2017

Related U.S. Application Data

(63) Continuation of application No. 14/082,787, filed on Nov. 18, 2013, now Pat. No. 9,435,969, which is a
(Continued)

(51) Int. Cl.
*G02B 6/36* (2006.01)
*G02B 6/10* (2006.01)
(Continued)

(52) U.S. Cl.
CPC ........... *G02B 6/3895* (2013.01); *G02B 6/241* (2013.01); *G02B 6/389* (2013.01); *G02B 6/3865* (2013.01);
(Continued)

(58) Field of Classification Search
CPC ........ G02B 6/00; G02B 6/0001; G02B 6/122; G02B 6/38; G02B 6/3849; G02B 6/3865;
(Continued)

(56) References Cited

U.S. PATENT DOCUMENTS 5,666,453 A   9/1997   Dannenmann
6,554,485 B1  4/2003   Beatty et al.
(Continued)

FOREIGN PATENT DOCUMENTS

CN   1561463 A   1/2005
CN   2879221 Y   3/2007
(Continued)

OTHER PUBLICATIONS

International Search Report and Written Opinion for PCT/IB2013/002029 dated Apr. 3, 2014.
(Continued)

*Primary Examiner* — Tina Wong
*Assistant Examiner* — Michael Mooney
(74) *Attorney, Agent, or Firm* — Merchant & Gould P.C.

(57) ABSTRACT

A connector plug arrangement (330, 600, 700) includes a connector body (334, 610, 720); and an indication component (335, 650, 750). The indication component (335, 650, 750) includes a first portion (337, 653, 751) that is disposed at a rear end of the connector body and a second portion (339, 654, 753) that extends outwardly from the first portion (337, 653, 751). The first portion (337, 653, 751) is configured to extend along a circumferential perimeter of the connector body (334, 610, 720). The second portion (339, 654, 753) is configured to extend along the longitudinal axis of the connector body (334, 610, 720).

20 Claims, 24 Drawing Sheets

Related U.S. Application Data continuation-in-part of application No. 13/939,822, filed on Jul. 11, 2013, now Pat. No. 9,405,080.

(60) Provisional application No. 61/670,474, filed on Jul. 11, 2012, provisional application No. 61/727,343, filed on Nov. 16, 2012.

(51) Int. Cl.

| | | |
|---|---|---|
| *H01R 43/00* | (2006.01) | |
| *G02B 6/38* | (2006.01) | |
| *H01R 13/717* | (2006.01) | |
| *G02B 6/42* | (2006.01) | |
| *G02B 6/24* | (2006.01) | |
| *H01R 43/24* | (2006.01) | |
| *H04Q 1/02* | (2006.01) | |
| *H01R 13/58* | (2006.01) | |

(52) U.S. Cl.
CPC ......... *G02B 6/3887* (2013.01); *G02B 6/3897* (2013.01); *G02B 6/4201* (2013.01); *G02B 6/4292* (2013.01); *H01R 13/5845* (2013.01); *H01R 13/717* (2013.01); *H01R 43/24* (2013.01); *H04Q 1/136* (2013.01); *H04Q 1/138* (2013.01); *G02B 6/3849* (2013.01); *Y10T 29/4922* (2015.01)

(58) Field of Classification Search
CPC ...... G02B 6/387; G02B 6/3887; G02B 6/389; G02B 6/3895; G02B 6/42; G02B 6/4219; G02B 6/4439; G02B 6/3897; H01R 13/7175; H01R 23/68; H01R 13/717; H01R 13/5845; H01R 13/6658; H04Q 1/136; H04Q 1/138
USPC ........ 385/70–85, 88, 92, 134–139, 146–147, 385/901; 362/551, 555; 439/76.1, 278, 439/470, 490, 620.22; 29/883; 340/687, 340/815.42; 324/537
See application file for complete search history.

(56) References Cited

U.S. PATENT DOCUMENTS

| | | |
|---|---|---|
| 6,634,798 B2 | 10/2003 | Cheng |
| 6,712,524 B2 | 3/2004 | Beatty et al. |
| 7,274,843 B2 | 9/2007 | James, IV et al. |
| 7,329,049 B2 | 2/2008 | Meek et al. |
| 7,421,184 B2 | 9/2008 | Long |
| 7,565,053 B2 | 7/2009 | Zimmel et al. |
| 7,572,066 B2 | 8/2009 | de Jong et al. |
| 7,670,170 B2 | 3/2010 | Henry et al. |
| 8,041,177 B2 | 10/2011 | Zimmel et al. |
| 8,172,468 B2 | 5/2012 | Jones et al. |
| 9,405,080 B2 | 8/2016 | Lambourn |
| 9,435,969 B2 | 9/2016 | Lambourn et al. |
| 2002/0090180 A1 | 7/2002 | Silverbrook |
| 2003/0002810 A1 | 1/2003 | Cheng |
| 2003/0207622 A1 | 11/2003 | Gutierrez et al. |
| 2005/0135772 A1 | 6/2005 | Nield et al. |
| 2009/0269019 A1 | 10/2009 | Andrus et al. |
| 2010/0029117 A1 | 2/2010 | Underwood et al. |
| 2010/0210134 A1 | 8/2010 | Caveney et al. |
| 2011/0115494 A1 | 5/2011 | Taylor et al. |
| 2011/0221609 A1 | 9/2011 | Aguren et al. |
| 2012/0294572 A1 | 11/2012 | Petersen |
| 2014/0023326 A1 | 1/2014 | Anderson et al. |
| 2014/0023328 A1 | 1/2014 | Lambourn |

FOREIGN PATENT DOCUMENTS

| | | |
|---|---|---|
| CN | 201035191 Y | 3/2008 |
| JP | 2000-322165 | 11/2000 |
| JP | 2005-516233 A | 6/2005 |
| WO | WO 2011/049967 A1 | 4/2011 |
| WO | WO 2011/100634 A2 | 8/2011 |
| WO | WO 2014/009390 A1 | 1/2014 |

OTHER PUBLICATIONS

International Search Report and Written Opinion for PCT/IB2013/003128 dated Jul. 2, 2014.
Partial International Search Report for PCT/IB2013/002029 dated Feb. 12, 2014.

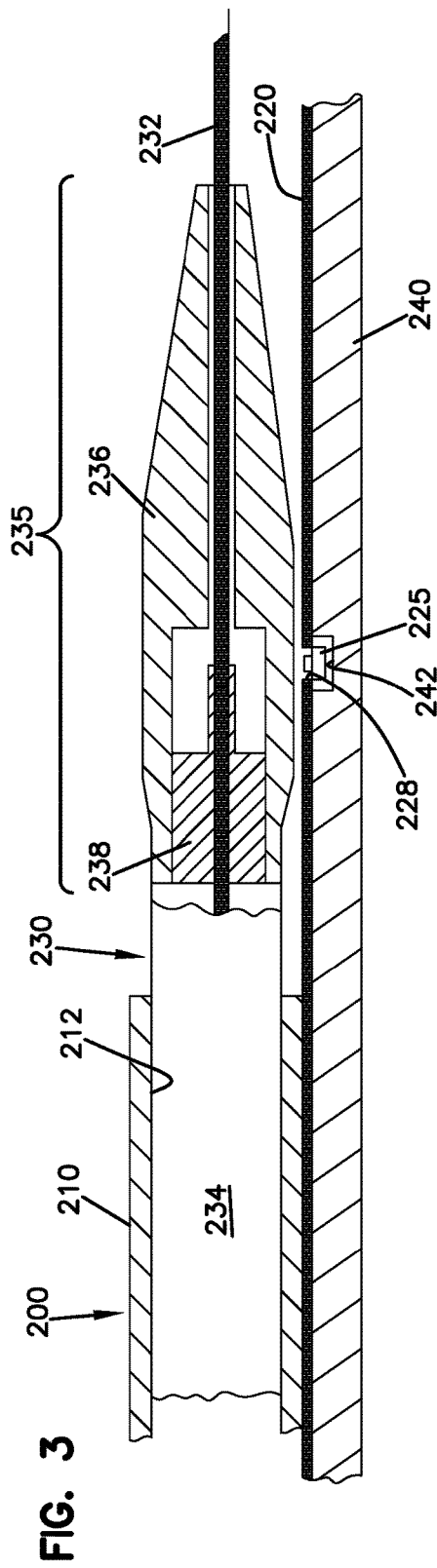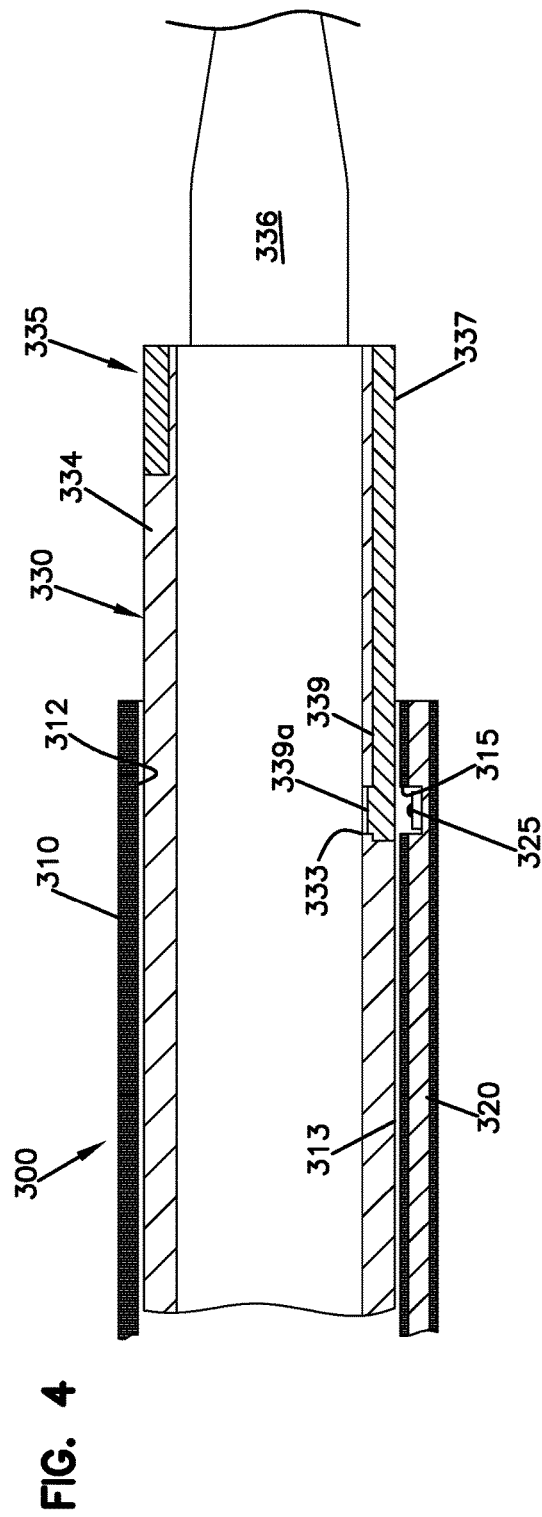

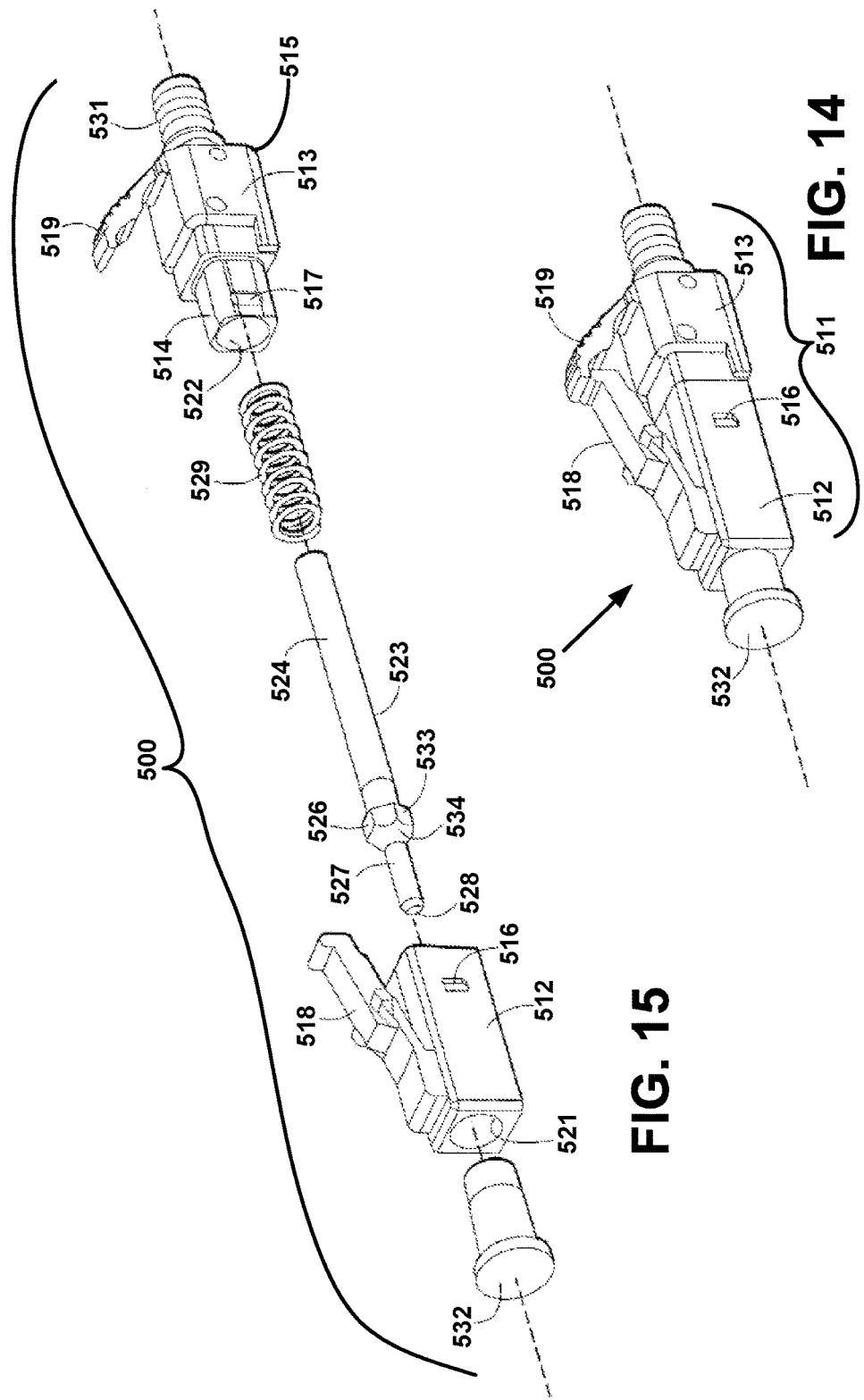

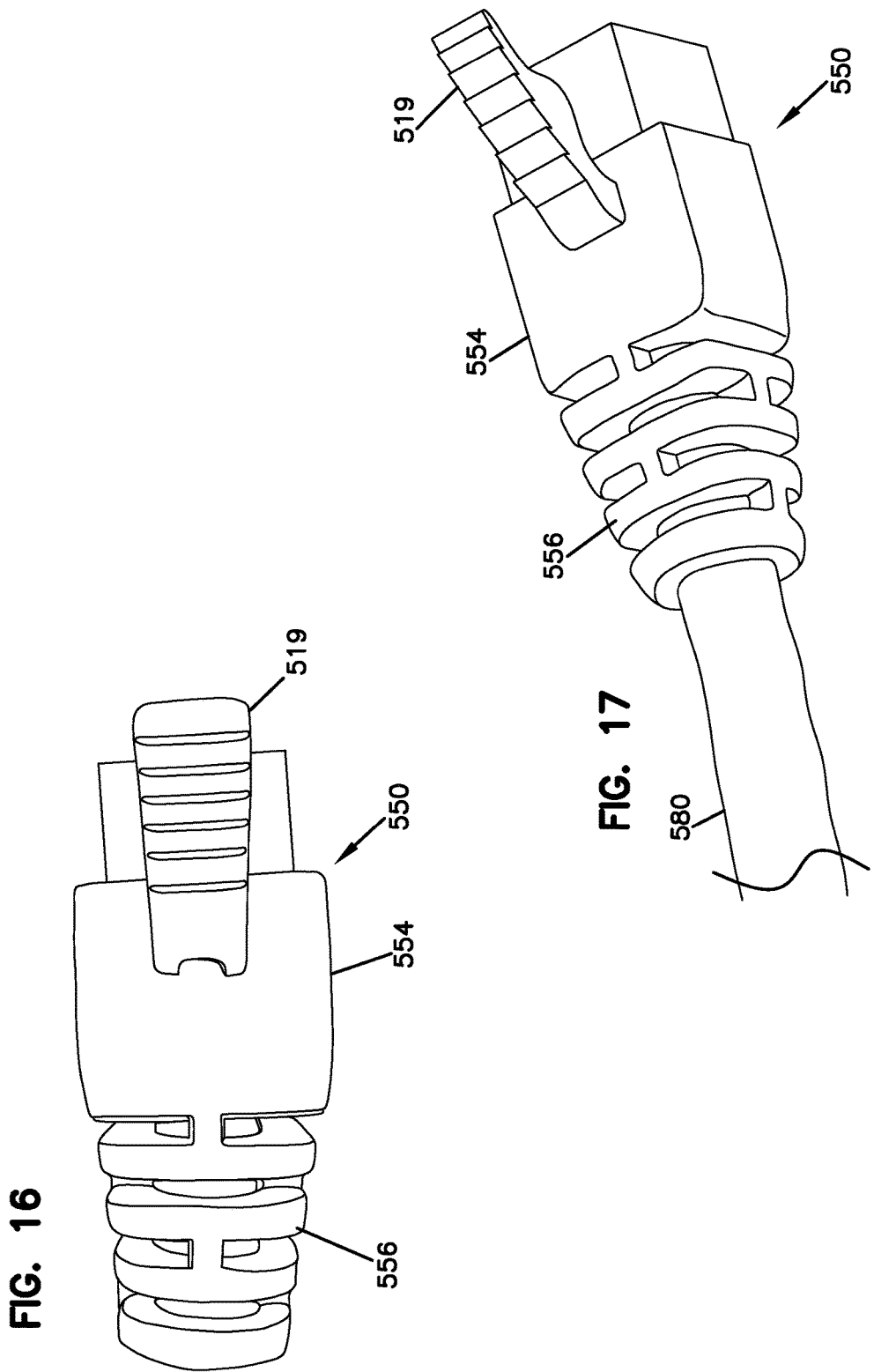

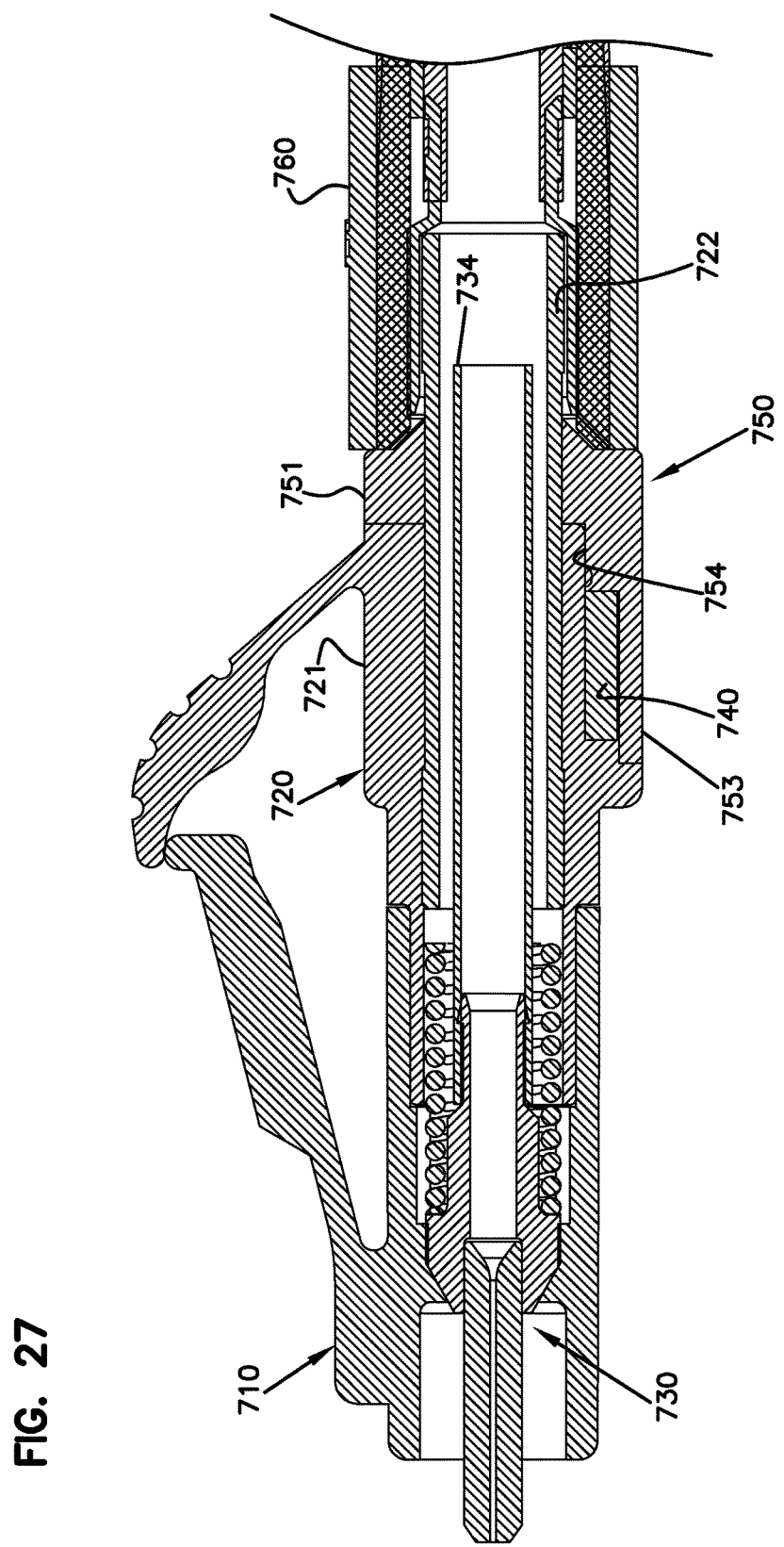

INDICATING COMMUNICATIONS COMPONENTS VIA ILLUMINATION

CROSS-REFERENCE TO RELATED APPLICATIONS

This application is a continuation of application Ser. No. 14/082,787, filed Nov. 18, 2013, now U.S. Pat. No. 9,435,969, which is a continuation-in-part of application Ser. No. 13/939,822, filed Jul. 11, 2013, now U.S. Pat. No. 9,405,080, which application claims the benefit of U.S. Provisional Application No. 61/670,474, filed Jul. 11, 2012, and titled "RFID Visual Indicator in a Physical Layer Management System;" and U.S. Provisional Application No. 61/727,343, filed Nov. 16, 2012, and titled "Indicating Communications Components via Illumination," which applications are incorporated herein by reference in their entirety.

BACKGROUND

Communications services (e.g., fiber optic connectivity and service; copper connectivity and service) are being extended to more and more customers, both commercial and residential. With the increase in use of copper and fiber cables in the communications industry, it is desirable to provide devices with increased termination density. By density, it is meant the number of locations per unit volume or unit area for providing connection on a particular communications device.

With the increased density of communications connections in telecommunications devices, quick identification of the individual connection ports, e.g., for service or for other purposes, presents a challenge, especially in low-light environments. A system for quick identification of the individual ports in a high density distribution environment is desirable.

SUMMARY

In accordance with aspects of the disclosure, a cable connection system includes a coupling housing defining at least a first port; a printed circuit board coupled to the coupling housing; and a communications component sized to be received at the first port of the coupling housing. The printed circuit board includes a light source. At least an indication section of the communications component is formed of or coated with a light transmissible material. The indication section is aligned with the light source when the communications component is received at the first port of the coupling housing so that light emitted from the light source illuminates the indication section of the communications component.

In some implementations, the communications component includes a plug connector configured to be received at the first port of the coupling housing. In an example, the indication section includes a boot of the plug connector. In another example, the indication section includes a main body of the plug connector. In other examples, the communications component includes a dust cap configured to be received at the first port of the coupling housing. In an example, the dust cap is fully formed of the light transmissible material.

In accordance with other aspects of the disclosure, a plug connector arrangement includes a connector body configured to hold a terminated end of a communications media; and an indication attachment member coupled to the connector body. The indication attachment member is formed of or coated with a light transmissible material that is configured to illuminate when light is shown on the indication attachment member. In certain implementations, the connector body defines a recessed portion and the indication attachment member is configured to fit over the recessed portion. In certain implementations, the indication attachment member is configured to latch to the connector body. In certain implementations, the indication attachment member includes a first portion that encircles a first end of the connector body and a second portion that extends a distance along a length of the connector body from the first portion.

In accordance with other aspects of the disclosure, a coupler arrangement includes a coupling housing, a printed circuit board, and a light source. The coupling housing defines at least a first port and includes a first side having an interior surface defining a recess adjacent the first port. The printed circuit board is embedded within the first side of the coupling housing between the interior surface and an exterior surface of the first side. The light source is coupled to the printed circuit board and aligned with the recess defined in the interior surface of the first side of the coupling housing. The light source is configured to emit light through the recess.

In some implementations, the coupling housing includes an optical adapter. In other implementations, the coupling housing includes a socket in which electrical contacts are disposed.

In some implementations, the printed circuit board is embedded within the coupling housing. In other implementations, the coupling housing is mounted to the printed circuit board, which extends beyond the first port of the coupling housing. In an example, light source is mounted to a top surface of the printed circuit board. In another example, the light source is mounted within a recess defined in the printed circuit board. In another example, the light source is bottom-mounted to the printed circuit board, which defines an aperture sized to enable the emitted light to reach the indication section of the plug connector through the aperture.

In accordance with other aspects of the disclosure, a dust cap configured to be mounted at a port of a coupling housing includes a mounting portion and a cover portion. The mounting portion is sized and configured to extend through the port of the coupling housing and to secure to an interior of the coupling housing. The mounting portion includes a light transmissible material. The mounting portion includes an enlarged diameter section at the first end. The cover portion is coupled to the mounting portion. The cover portion includes a light transmissible material. The cover portion has a cross-dimension larger than a cross-dimension of the port so that the cover portion is retained outside of the coupling housing when the mounting portion extends through the port.

In accordance with other aspects of the disclosure, a method for indicating a dust cap at a coupling housing includes sending a control signal to a light source that aligns with an annular side of the dust cap to emit light while maintaining isolation of the light from any communications media segments disposed within the coupling housing.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 3 illustrates one example implementation of a cable connection system including a light source mounted at a location spaced from an adapter;

FIG. 4 illustrates another example implementation of a cable connection system including a light source mounted to shine within an interior of an adapter;

FIG. 14 is a perspective view of an example LC connector having an indication component;

FIG. 15 is an exploded view of the LC connector of FIG. 14;

FIG. 16 is a top plan view of another example LC connector having an indication component;

FIG. 17 is a rear perspective view of the LC connector of FIG. 16;

FIG. 27 is a longitudinal cross-sectional view of the LC connector of FIG. 23.

DETAILED DESCRIPTION

Reference will now be made in detail to exemplary aspects of the present disclosure that are illustrated in the accompanying drawings. Wherever possible, the same reference numbers will be used throughout the drawings to refer to the same or like parts.

In general, a cable connection system includes a coupling housing defining at least a first port; a light source disposed at the coupling housing; and a communications component sized to be received at the first port of the coupling housing. At least an indication section of the communications component includes (e.g., is formed of, is coated with, etc.) a light transmissible material. The indication section is aligned with the light source when the communications component is received at the first port of the coupling housing so that light emitted from the light source illuminates the indication section of the communications component. In certain examples, the entire communications component is formed of the light transmissible material. When the communications component is removed from the first port, light from the light source illuminates an interior of the first port.

In some implementations, the coupling housing includes an optical adapter (an SC adapter, an LC adapter, an MPO adapter, etc.). In some such implementations, the communications component includes an optical plug connector. In other such implementations, the communications component includes a dust cap. In other implementations, the coupling housing includes an electrical socket (e.g., an RJ jack, a USB jack, etc.). In certain implementations, the communications component includes an electrical plug connector. For the sake of convenience, the following illustrated examples of cable connection systems show optical cable connection systems. It should be understood that these principles can be applied to electrical cable connection systems.

Figure 1:
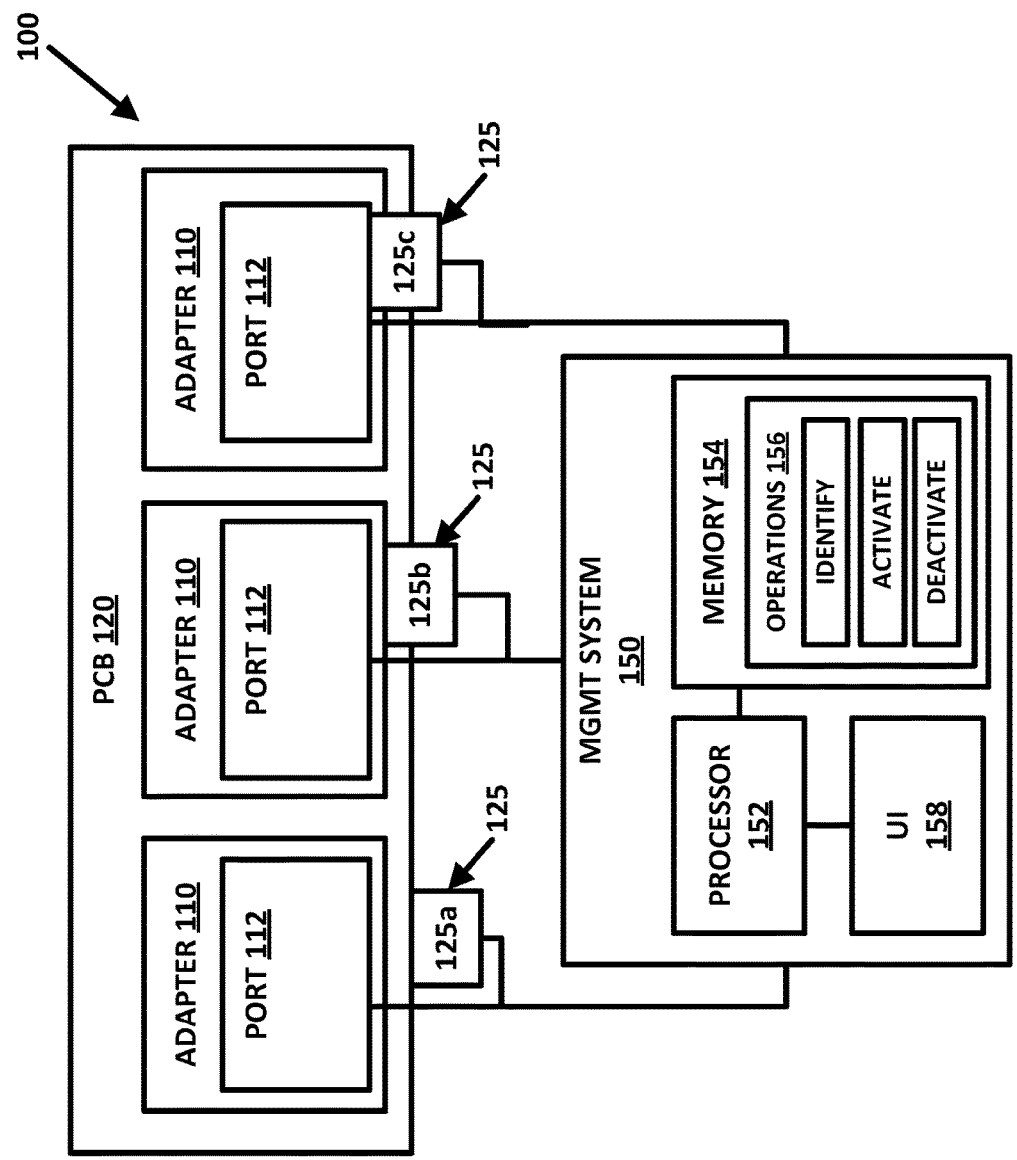
FIG. 1 is a schematic block diagram showing a communications system including a cable connection system and a management system.

FIG. 1 is a schematic block diagram showing a communications system including a cable connection system 100 and a management system 150. The cable connection system 100 includes one or more coupling housings (e.g., optical adapters, electrical sockets, etc.) 110 that define at least a first port 112. In certain implementations, each coupling housing 110 is configured to couple together two or more segments of communications media (e.g., optical fibers, electrical conductors, etc.). Each port 112 is associated with a light source (e.g., light emitting diode) 125 that can be utilized to indicate the adapter 110, the port 112, and/or the plug connector received thereat.

The light sources 125 may be operatively associated with the coupling housings 110 via a printed circuit board 120. For example, a light source 125 in certain implementations may be coupled to a printed circuit board 120 to which an coupling housing 110 is coupled without being coupled directly to the coupling housing 110 (see light source 125a in FIG. 1). In another example, a light source 125 in certain implementations may be coupled to a printed circuit board 120 and to an exterior of a coupling housing 110 (see light source 125b in FIG. 1). In another example, a light source 125 in certain implementations may be coupled to an coupling housing 110 so that light emitted by the light source 125 enters an interior of the coupling housing 110 (see light source 125c in FIG. 1).

The management system 150 is coupled to the connection system 100 via the printed circuit board 120. For example, in some implementations, the management system 150 can be implemented as a controller or chip mounted to the printed circuit board 120. In other implementations, all or part of the management system 150 can be implemented by equipment coupled to the printed circuit board and mounted elsewhere. For example, the management system 150 can be implemented remotely and communicatively coupled to the connection system 100 via cables or wireless signals.

The management system 150 includes a processor 152 that implements operations 156 stored in a memory 154. Some example operations 156 that can be stored in memory 154 include an activate operation, which illuminates one or more of the light sources 125, and a deactivate operation, which switches off one or more of the light sources 125. Another example operation 156 that can be stored in memory 154 includes an identify operation, which determines which light source 125 is associated with a particular coupling housing 110 or port 112. The processor 152 can implement the activate or deactivate operations on the identified coupling housing 110 or port 112.

In some implementations, the management system 150 includes a user interface (UI) 158 that enables a user to implement the identify operation. For example, the UI 158 may present the user with a representation (e.g., graphical, textual, numerical, etc.) of the connection system 100 and may enable the user to select one of the coupling housings 110, ports 112, or other components of the connection system 100. The UI 158 also may enable a user to initiate implementation of the activate or deactivate operations on the light source 125 associated with the selected component. In other implementations, the processor 152 selects the light source 125 to be activated or deactivated based on an analysis of predetermined factors (e.g., error conditions).

Figure 2:
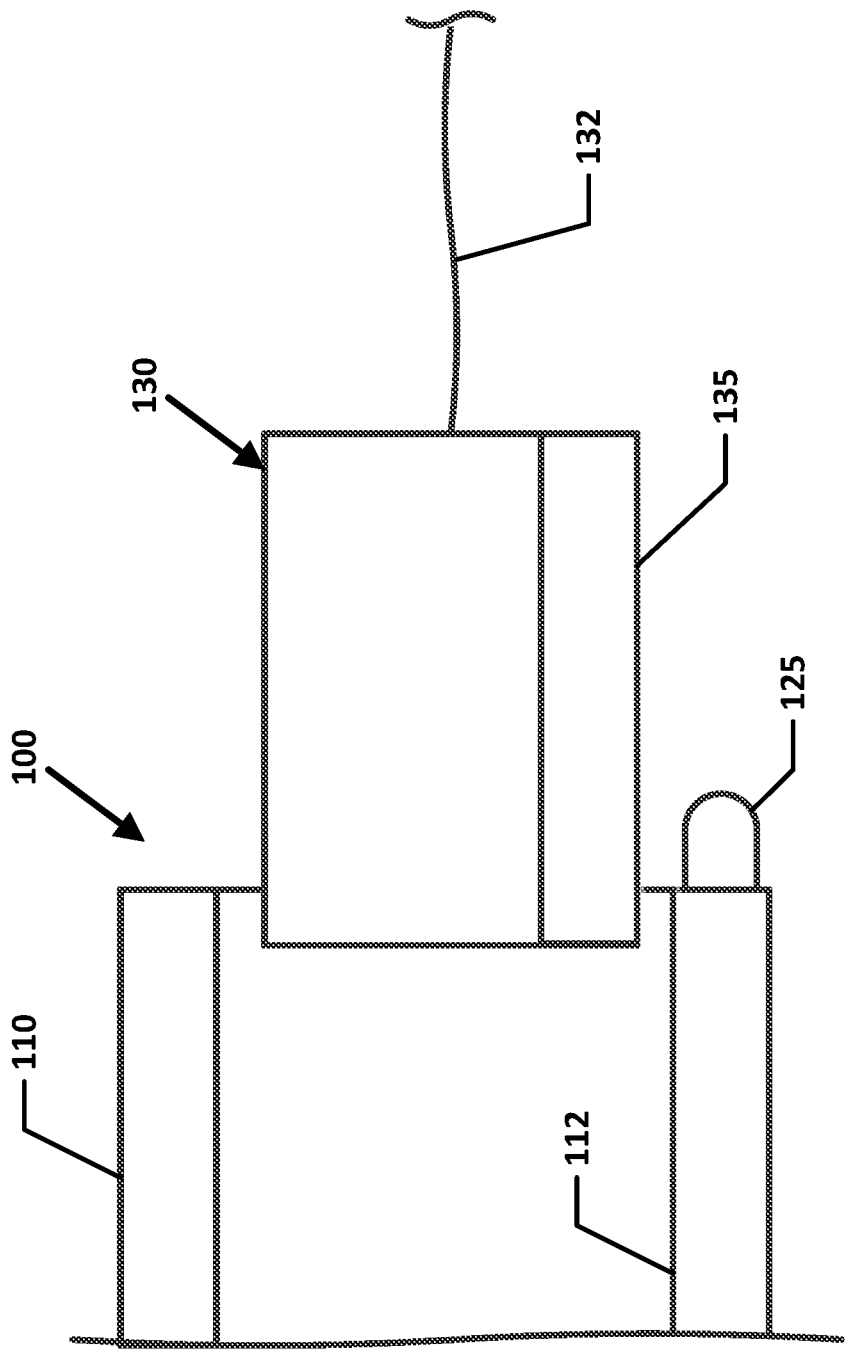
FIG. 2 is a schematic block diagram of a portion of the connection system of FIG. 1 showing an example plug connector being received at a port of one of the coupling housings.

FIG. 2 is a schematic block diagram of a portion of the connection system 100 of FIG. 1 showing an example plug connector 130 being received at a port 112 of one of the coupling housings 110. In some implementations, the coupling housing 110 is an optical adapter that mechanically aligns an optical plug connector 130 with another optical plug connector 130 received at an opposite port. In other implementations, the coupling housing 110 is an electrical socket that mechanically aligns an electrical plug connector 130 with conductive contacts housing within the socket.

For ease in viewing, the schematic diagram of FIG. 2 shows an example light source 125 coupled to an exterior of the coupling housing 110. In other implementations, however, the light source 125 can be coupled to an interior of the coupling housing 110 or to a printed circuit board 120 (FIG. 1) coupled to the coupling housing 110. The plug connector 130 being received at the port 112 of the coupling housing 110 terminates a segment 132 of communications media (e.g., an optical fiber, an electrical conductor, etc.). In some implementations, the plug connector 130 includes a main body and a strain-relief boot.

At least a portion of the plug connector 130 is configured to be illuminated by the light source 125. In some implementations, the entire plug connector 130 includes (e.g., is formed of or is coated with) a light transmissible material. In other implementations, the plug connector 130 includes an indication section 135 that generally aligns with the light source 125 when the plug connector 130 is received at the port 112. The light source 125 is configured to illuminate the indication section 135 to identify or otherwise indicate the plug connector 130, port 112, and/or coupling housing 110. For example, the indicator section 135 can be formed at least partially of or coating with a light transmissible material (e.g., glass, opaque plastic, a fluorescent or otherwise luminescent material, etc.). The light transmissible material transfers light from a location (e.g., on the indicator section 135) at which the emitted light reaches the indicator section 135 to one or more locations (e.g., on the indicator section 135) from which a user may discern the light.

In some implementations, the indicator section 135 forms the main body of the connector plug arrangement 130 or a portion thereof. In other implementations, the indicator section 135 forms the strain-relief boot of the connector plug arrangement 130 or a portion thereof. In certain implementations, a majority of the indicator section 135 is disposed outside of the adapter 110 when the connector plug arrangement 130 is received at the first port 112. In certain implementations, the indicator section 135 is fully located outside of the adapter 110 when the connector plug arrangement 130 is received at the first port 112. In other implementations, a majority of the indicator section 135 can be disposed within the adapter port 112.

FIGS. 3-7 illustrate various implementations of connection systems suitable for connection to the management system 150. For convenience, the connections systems of FIGS. 3-7 are implemented as optical connection systems. It should be understood, however, that the principles disclosed herein can be applied to electrical connection systems.

FIG. 3 illustrates one example implementation of a cable connection system 200. The example cable connection system 200 includes an optical adapter 210 defining a port 212 at which a connector plug arrangement 230 can be received. The opposing port of the adapter 210 is not shown for clarity. The adapter 210 is associated with a light source 225. In some implementations, the light source 225 is disposed outside of the adapter 210. In certain implementations, the adapter 210 and the light source 225 are each mounted to a printed circuit board 220. For example, in certain implementations, the light source 225 is spaced along the printed circuit board 220 from the adapter 210.

In some implementations, the printed circuit board 220 can be mounted to a panel, tray, or other surface 240. The adapter 210 can be mounted to an opposite side of the printed circuit board 220 from the panel, tray, or other surface 240. In other implementations, the adapter 210 can be mounted directly to the panel, tray, or other surface 240 and the light source 225 can be spaced along the panel, tray, or other surface 240 from the adapter 210. For example, the light source 225 can be mounted to a printed circuit board 220 that is mounted to the panel, tray, or other surface 240 at a location spaced from the adapter 210.

The connector plug arrangement 230 includes a main housing 234 configured to hold an optical fiber or fiber cable 232 that can be coupled to another optical fiber received at the opposite port. In certain implementations, the connector plug arrangement 230 also includes a strain-relief boot 236 coupled to the main housing 234 to provide strain-relief to the optical fiber or cable 232. The connector plug arrangement 230 may include a holding section 238 at which the optical fiber or cable 232 may be anchored to the connector 230. The connector plug arrangement 230 includes an indicator section 235 that aligns with the light source 225 when the connector plug arrangement 230 is received at the first port 212. In certain implementations, the strain-relief boot 236 includes the indicator section 235. In the example shown in FIG. 3, the entire strain-relief boot 236 forms the indicator section 235.

The light source 225 is mounted relative to the adapter 210 so that light emitted by the light source 225 shines towards the indicator section 235 of the connector plug arrangement 230. In the example shown in FIG. 3, the adapter 210 and the light source 225 are mounted to a printed circuit board 220, which is mounted to a surface 240.

In the example shown, the light source 225 is bottom-mounted to the printed circuit board 220 and accommodated by a recess 242 defined in the surface 240. The board 220 defines an aperture 228 through which light emitted from the light source 225 travels to reach the indicator section 235 of the connector plug arrangement 230. In other implementations, however, the light source 225 can be top-mounted or flush-mounted with the printed circuit board 220.

In the example shown in FIG. 3, the adapter 210 is disposed over the printed circuit board 220 at a first location and the light source 225 is mounted to the printed circuit board 220 at a second location spaced from the first location. Light emitted by the light source 225 does not enter the interior of the adapter 210. A portion of the strain-relief boot 236 of the plug connector arrangement 230 aligns with light source 225 when the plug connector arrangement 230 is received at the first port 212 of the adapter 210. Light from the light source 225 illuminates the indicator section 235 of the strain-relief boot 236 when activated. The light from the light source 225 does not affect communications signals carried over the media segment 232.

In some implementations, the adapter 210 is mounted to the printed circuit board 220. In other implementations, the adapter 210 and the printed circuit board 220 are separately mounted to the surface 240 so that at least part of the board 220 is disposed beneath the adapter 210. Mounting the adapter 210 to the surface instead of to the board 220 facilitates removal of the adapter 210 for replacement, cleaning, and/or enhanced access to the ports.

Figure 5:
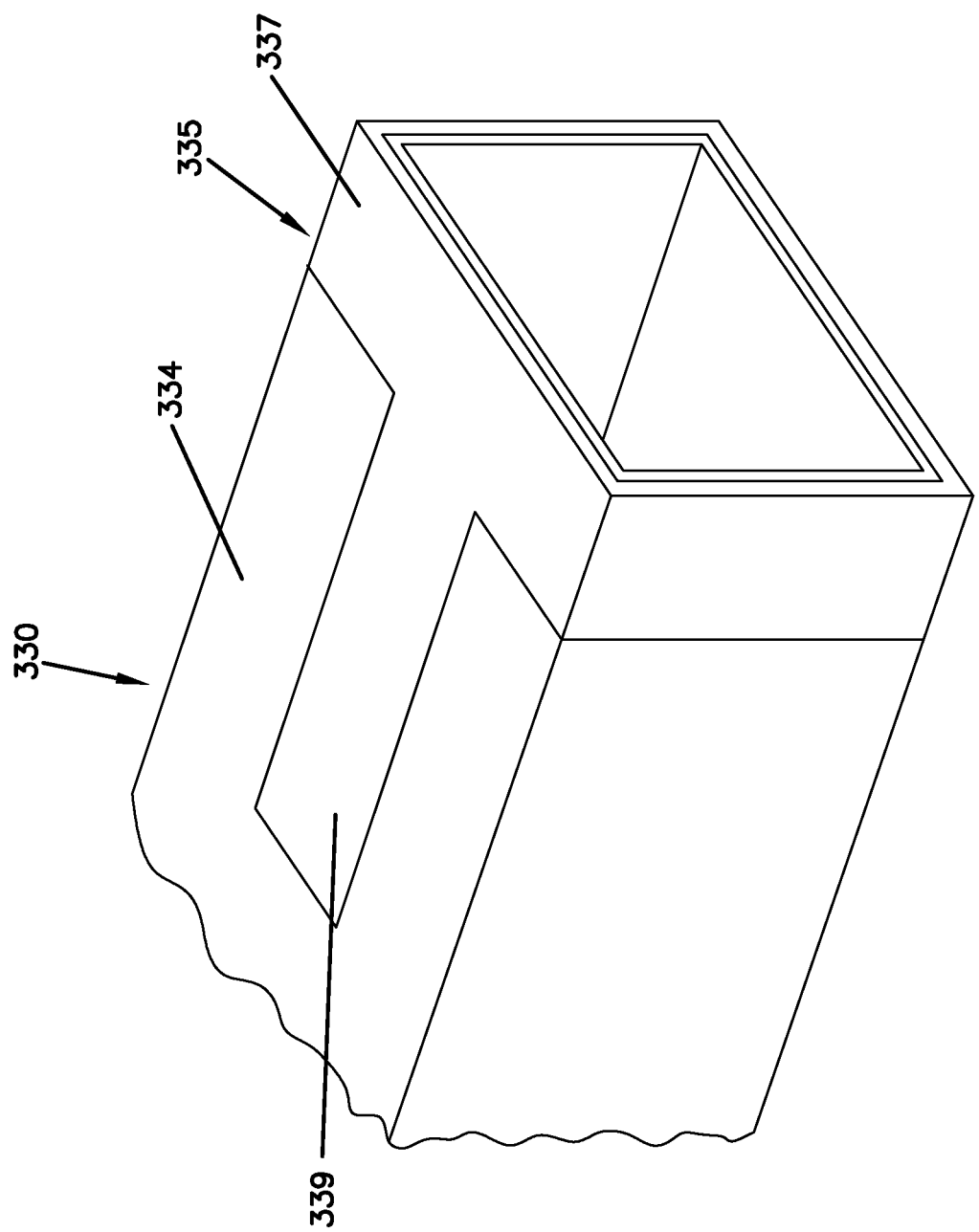
FIG. 5 is a perspective view of an example connector housing suitable for use in the connection system of FIG. 4.
Figure 6:
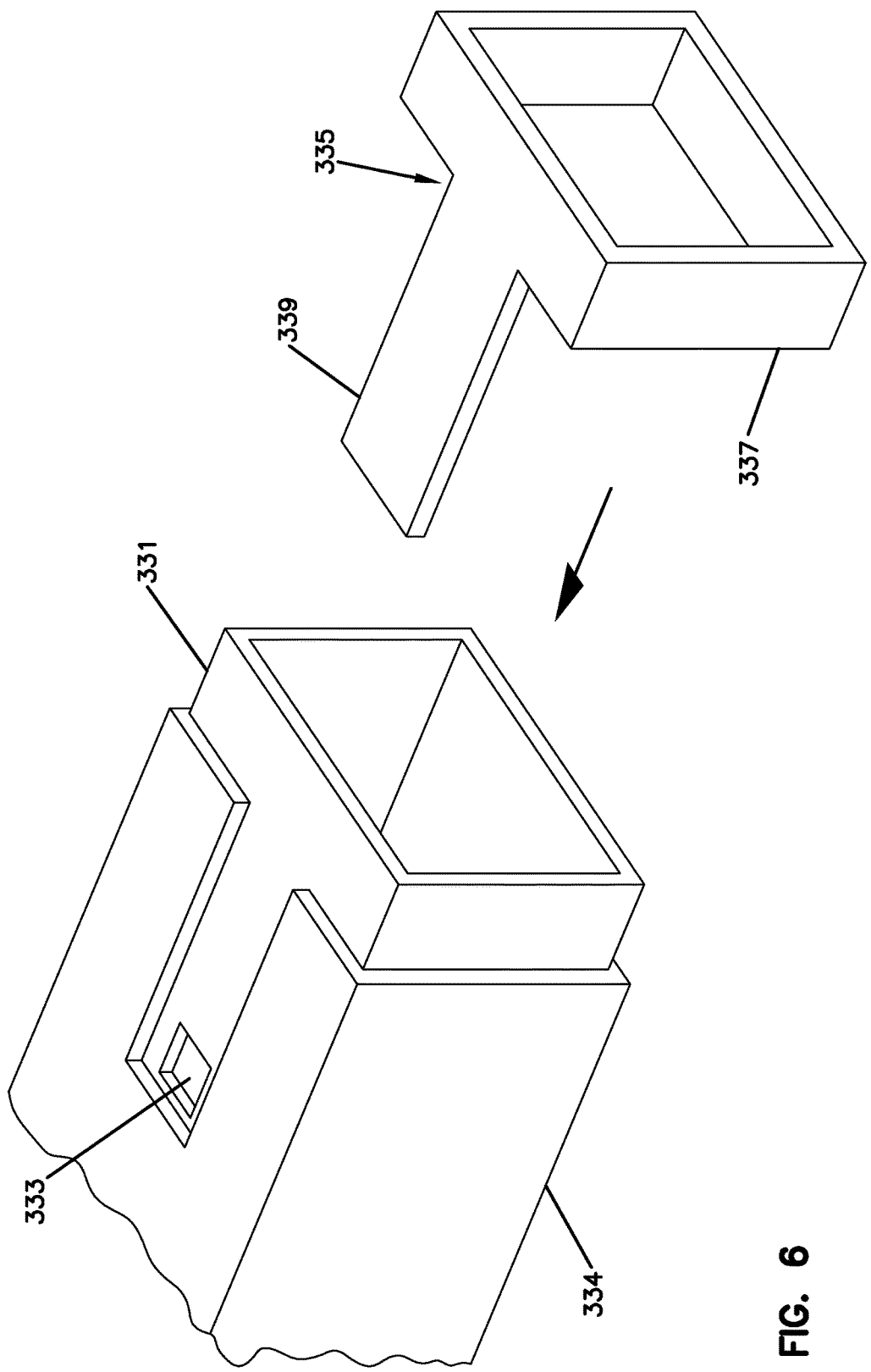
FIG. 6 is a perspective view of the connector housing of FIG. 5 with an indicator section shown exploded from the rest of the adapter.

FIGS. 4-6 illustrate another example implementation of a cable connection system 300. The example cable connection system 300 also includes an optical adapter 310, a light source 325, and a connector plug arrangement 330. The adapter 310 defines a first port 312 for receiving the connector plug arrangement 330. In some implementations, the light source 325 is configured to emit light into the interior of the adapter 310. However, the light source 325 is disposed and oriented to that the light emitted by the light source 325 does not interfere or otherwise affect the communications signals passing over the optical fibers of the connector plug arrangement 330.

In some implementations, the light source 325 is mounted at an interior of the adapter 310. In other implementations, however, the light source 325 is mounted to a printed circuit board 320 coupled to the adapter 310. In certain implementations, a side wall 313 of the adapter 310 defines an aperture 315 through which the light from the light source 325 shines into the adapter 310. In some such implementations, the printed circuit board 320 is embedded within a side wall 313 of the adapter 310 (see FIG. 4). In other such implementations, the printed circuit board 320 extends along an exterior surface of the adapter 310.

The connector plug arrangement 330 includes a main housing 334 configured to hold an optical fiber or fiber cable that can be coupled to another optical fiber received at the opposite port. At least a portion of the main housing 334 extends outwardly from the adapter 310 when the plug connector arrangement 330 is mounted at the port 312. In certain implementations, the connector plug arrangement 330 also includes a strain-relief boot 336 coupled to the main housing 334 to provide strain-relief to the optical fiber or cable. The connector plug arrangement 330 may include a holding section (not shown) at which the optical fiber or cable may be anchored to the connector 330.

The connector plug arrangement 330 includes an indicator section 335 that aligns with the light source 325 when the connector plug arrangement 330 is received at the first port 312. In some implementations, the indicator section 335 forms part of the main housing 334. In certain implementations, the indicator section 335 forms a separate piece part that can be coupled to the main body 334 (see FIG. 6). At least a first portion 337 of the indicator section 335 is disposed outside of the adapter 310 and a second portion 339 of the indicator section 335 is disposed inside of the adapter 310 when the plug connector arrangement 330 is received at the port 312. Light shining on the first portion 337 of the indicator section 335 is transmitted along the indicator section 335 to the second portion 339 of the indicator section 335.

As shown in FIG. 6, the indicator section 335 can include a piece part that is sized and configured to fit over a mounting section 331 of the main housing 334. In some implementations, the mounting section 331 of the main housing 334 can define a reduced cross-dimension relative to the remainder of the main housing 334. For example, material can be removed from an exterior surface of the main housing 334 to form a recessed or ablated mounting section 331. The indicator section 335 has a thickness that enables an exterior surface of the indicator section 335 to extend flush with an exterior surface of the main housing 334.

In some implementations, the indicator section 335 can be latched, glued, or otherwise secured to the main housing 334. As shown in FIG. 4, a latching nose 339a can snap into a depression 333 defined in mounting section 331 of the housing 334. In certain implementations, the first portion 337 of the indicator member 335 extends around a perimeter of the mounting section 331 and the second portion 339 defines a flange extending outwardly from the first portion 337. In certain implementations, the latching nose 339a is disposed at a distal end of the second portion 339 of the indicator section 335.

Figure 7:
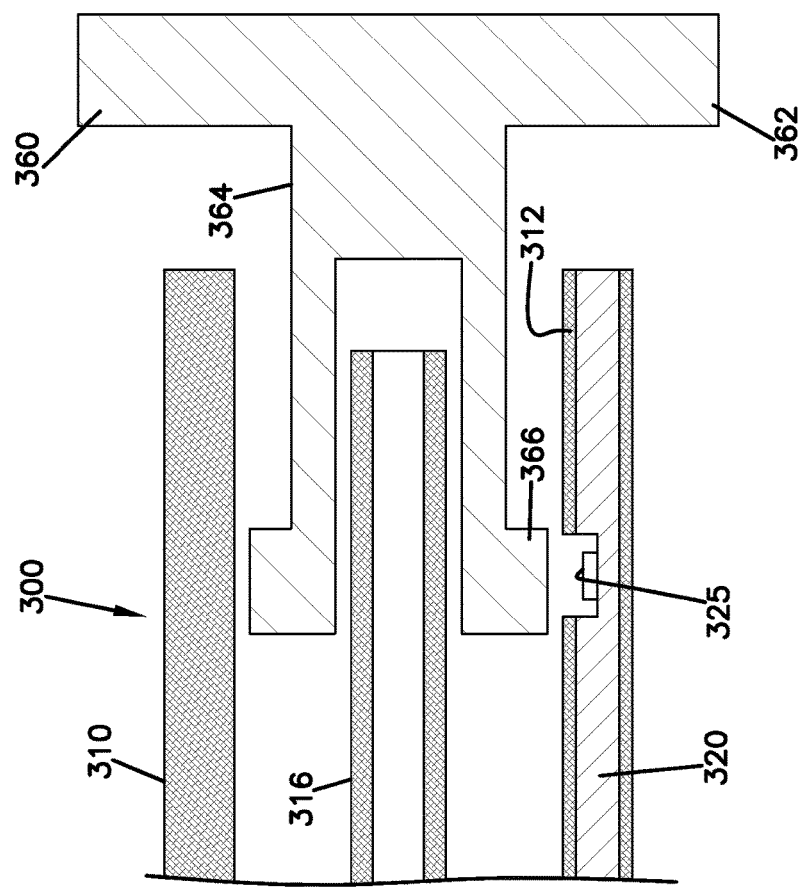
FIG. 7 illustrates an example dust cap suitable for use with the connection system of FIG. 4.
Figure 8:
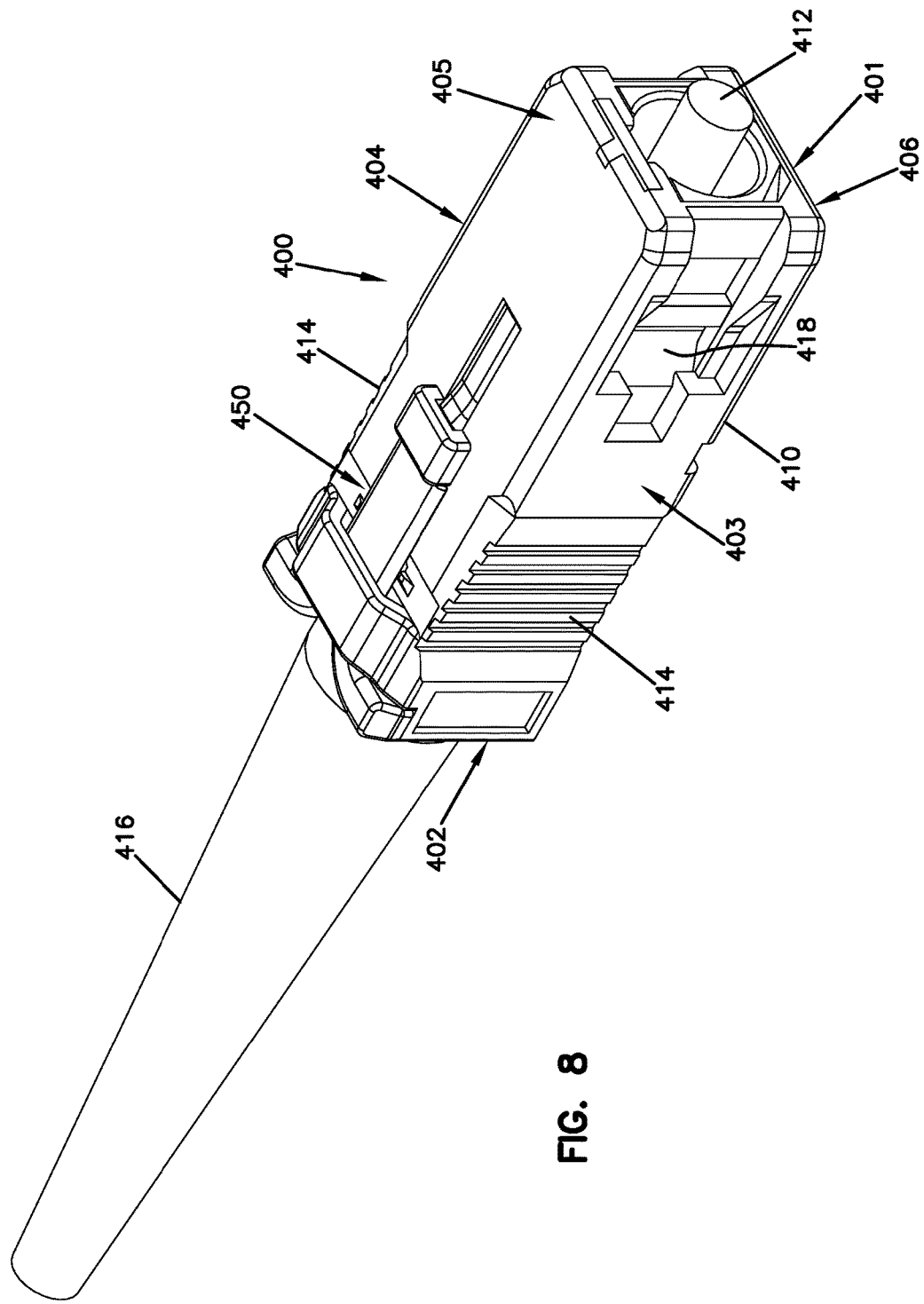
FIG. 8 is a front perspective view of an example SC connector having an indication component.
Figure 9:
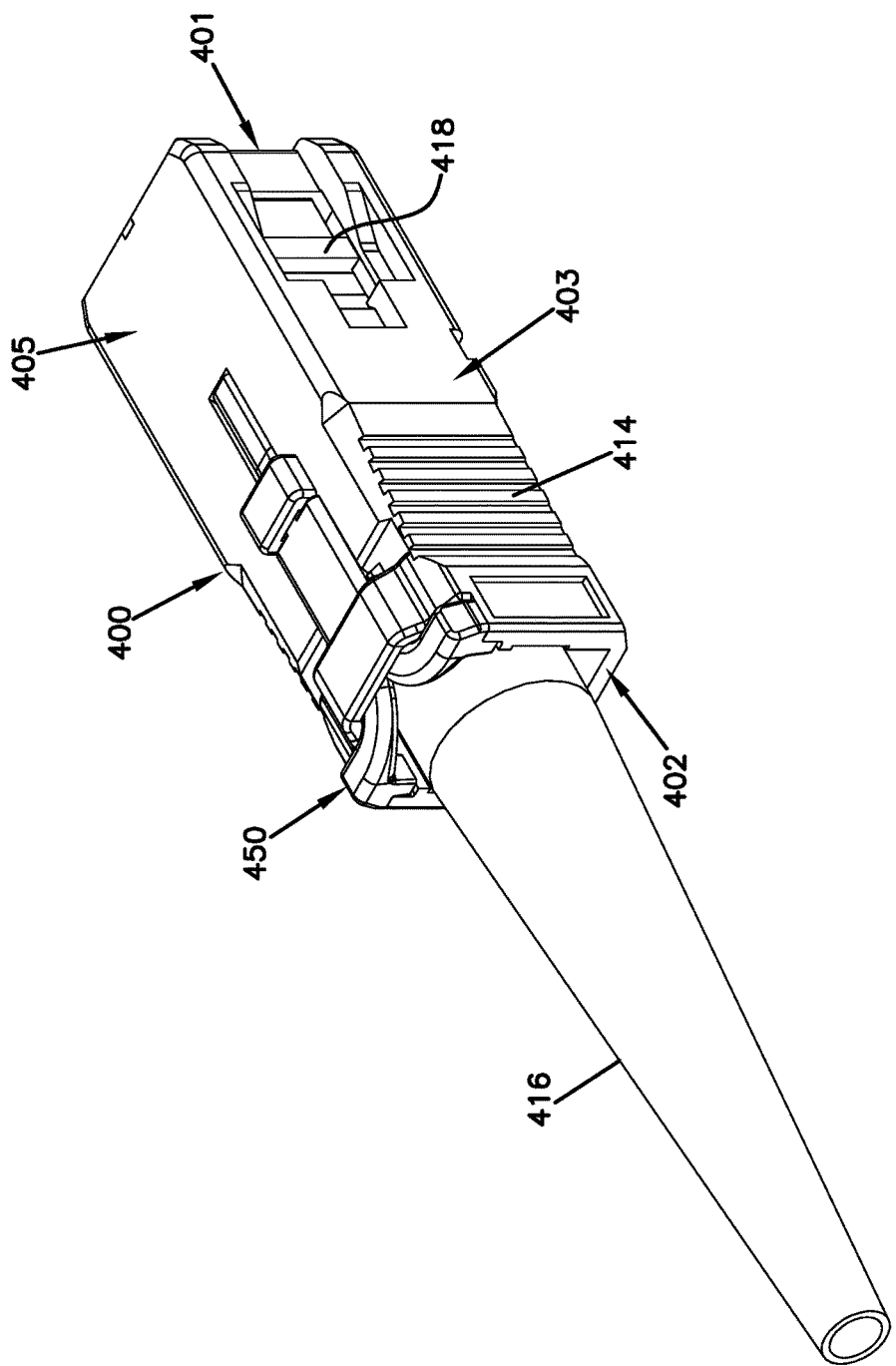
FIG. 9 is a rear perspective view of the SC connector of FIG. 8.

FIG. 7 illustrates an example dust cap 360 mounted at the first port 312 of the adapter 310 of the connection system 300 of FIG. 4. At least a portion of the dust cap 360 includes a light transmissible material so that the dust cap 360 or portion thereof can be illuminated by the light source 325. In the example shown, the entire dust cap 360 is formed of the light transmissible material. In other implementations, however, strips or other sections of the dust cap 360 may be formed of or coated with the light transmissible material. While the dust cap 360 is shown in use with the connection system of FIG. 4, it should be understood, that the dust cap 360 or similar structure can be utilized with other connection systems (e.g., connection system 200 of FIG. 3, electrical connection systems, etc.).

The dust cap 360 is configured to mount at the port 312 so that a first portion 362 remains outside of the adapter 310 and a second portion 364 extends into the adapter 310. For example, a cover portion 362 of the dust cap 360 may be sized to remain outside of the adapter 310 while a mounting portion 364 extends into the port 312. Light emitted from the light source 325 shines on the second portion 364 and is transmitted along the dust cap 360 to the first portion 362. Accordingly, the light source 325 can be utilized to illuminate the dust cap 360 to indicate or identify the port 312 or adapter 310 to the user.

In the example shown in FIG. 7, the adapter 310 includes an optical fiber adapter including a ferrule sleeve 316 that is sized and configured to receive a ferrule of a plug connector arrangement 330. The printed circuit board 320 is embedded in a sidewall of the adapter 310. The second portion 364 of the dust cap 360 is configured to mount over the ferrule sleeve 316 to mount the dust cap 360 to the port 312. In other implementations, the dust cap 360 may be latched or otherwise secured at the adapter port 312. In the example shown, a distal end of the second portion 364 of the dust cap 360 includes an enlarged diameter section 366. In certain implementations, the enlarged diameter section 366 facilitates reception of the light emitted from the light source 325 at the dust cap 360.

FIGS. 8-13 illustrate an example connector plug arrangement 400 having an indication component 450. The example connector plug arrangement 400 includes a body 410 having a front 401, a rear 402, a first side 403, a second side 404, a top 405, and a bottom 406. A ferrule 412 holding an optical fiber extends from the front 401 of the body 410. A strain-relief boot 416 couples to or extends from the rear 402 of the body 410. The body 410 includes a grip section 414 by which a user can grasp the plug connector 400 and a connection section 418 at which the plug connector 400 is secured to an optical adapter or other receptacle.

The indication component 450 is mounted to the plug connector body 410. In some implementations, the indication component 450 is mounted to extend towards the rear 402 of the body 410. In certain implementations, the indication component 450 is configured to extend over the boot 416. In other implementations, the indication component 450 is configured to extend over only the body 410. In some implementations, the indication component 450 extends from an intermediate portion of the body 410 to the rear 402 of the body 410 (e.g., see FIG. 10).

Figure 10:
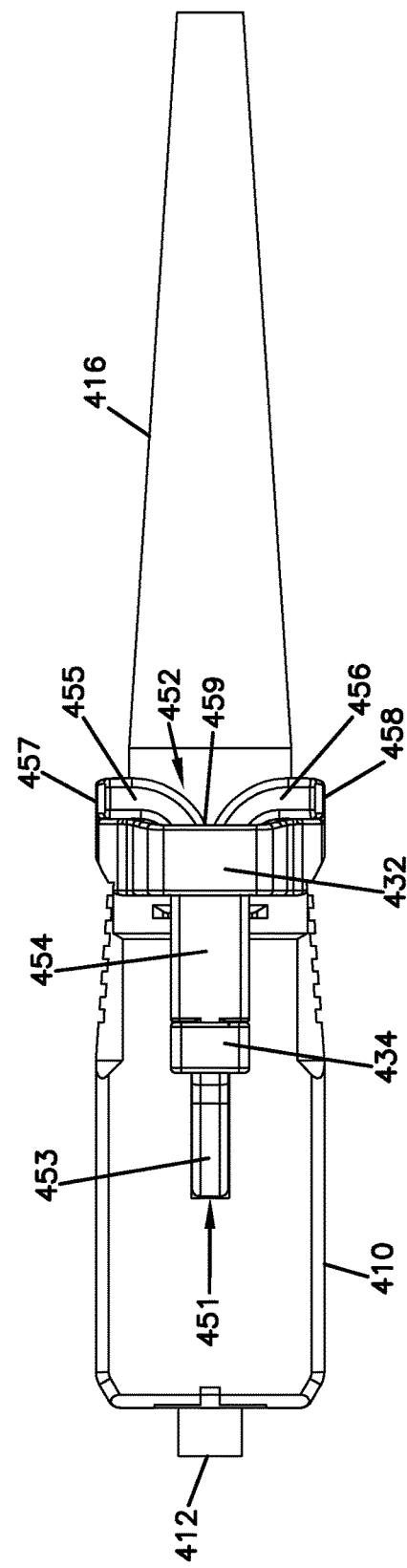
FIG. 10 is a top plan view of the SC connector of FIG. 8.

The indication component 450 extends from a first end 451 to a second end 452 (FIG. 10). The indication component 450 includes a first section 453 at the first end 451, an intermediate section 454, a first arm 455 at the second end 452, and a second arm 456 at the second end 452. In the example shown, the first and second arms 455, 456 branch off in opposite directions from the intermediate section 454. The first section 453 is narrow than the intermediate section 454. Light shown onto the first section 453 of the indication component 450 travels from the first section, through the intermediate section 454, and along the branch arms 455, 456.

In some implementations, the light causes the indication component 450 to glow. In certain implementations, the indication component 450 is configured so that light is more intensely visible at certain locations than from the rest of the indication component 450. In the example shown, the light is more intensely visible at the distal end 457 of the first branch arm 455, at the distal end 458 of the second branch arm 456, and at the intersection 459 of the two arms 455, 456. Accordingly, the light is visible at least from the rear 402 of the plug connector (e.g., via the intersection 459) and from the sides 403, 404 of the plug connector 400 (e.g., via the arm distal ends 457, 458).

In some implementations, the indication component 450 is formed at least partially from a clear or translucent material (e.g., glass, plastic, etc.). The light traveling through the translucent material of the indication component 450 can be white light or colored light. In other implementations, the indication component 450 can be formed from a material tinted one or more colors, but sufficiently translucent to enable light to travel through the material.

Figure 11:
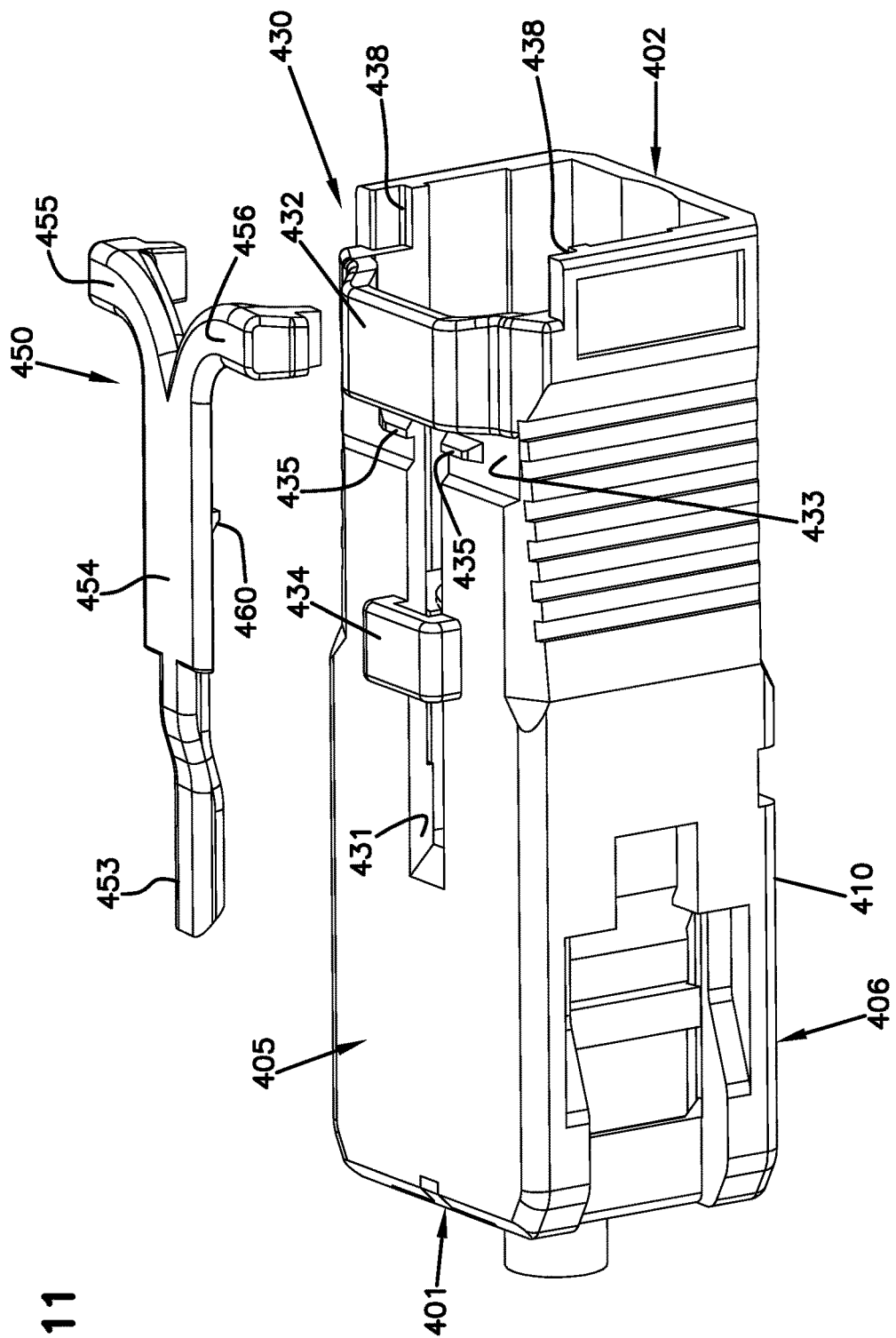
FIG. 11 is a perspective view of the SC connector of FIG. 8 with the indication component exploded from a body of the SC connector.
Figure 12:
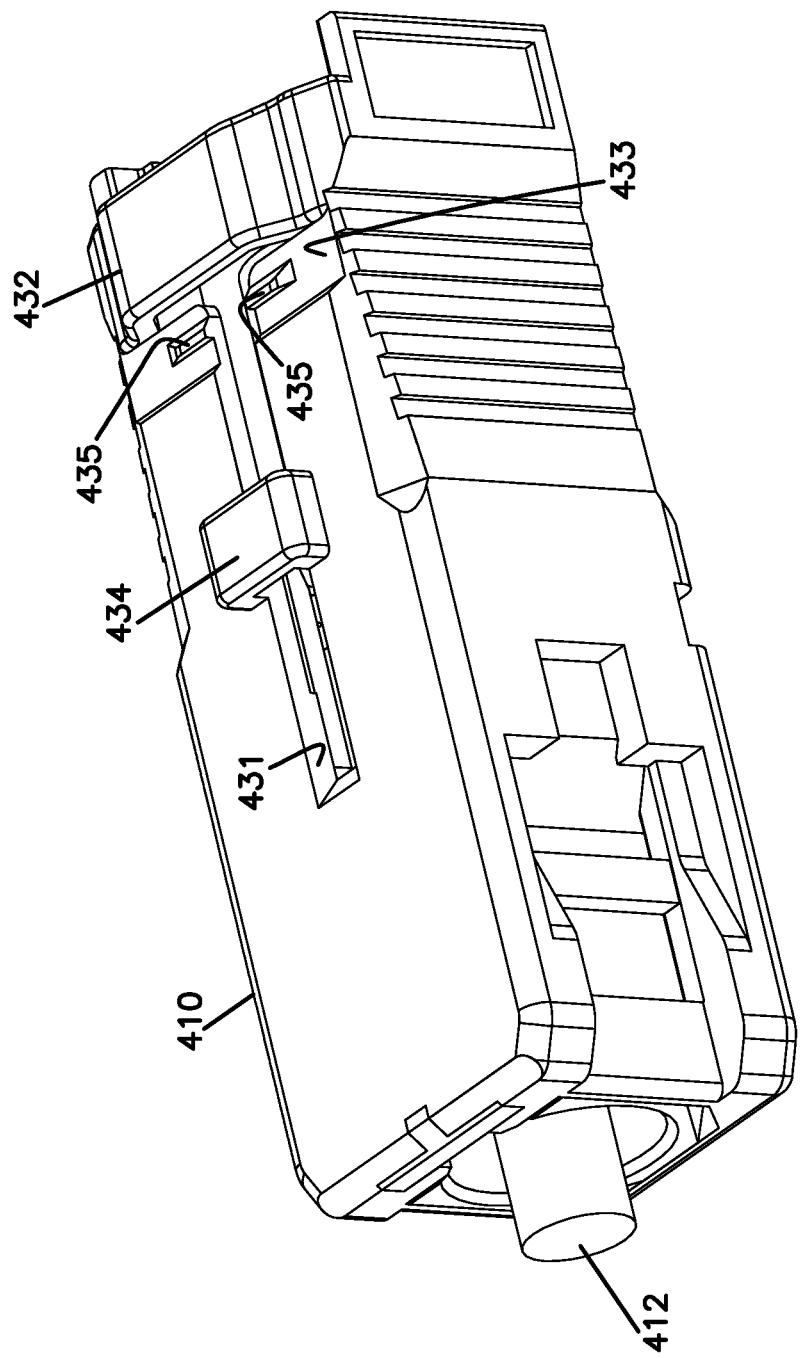
FIG. 12 is a top perspective view of the SC connector body of FIG. 11 with the indication component removed from view.
Figure 13:
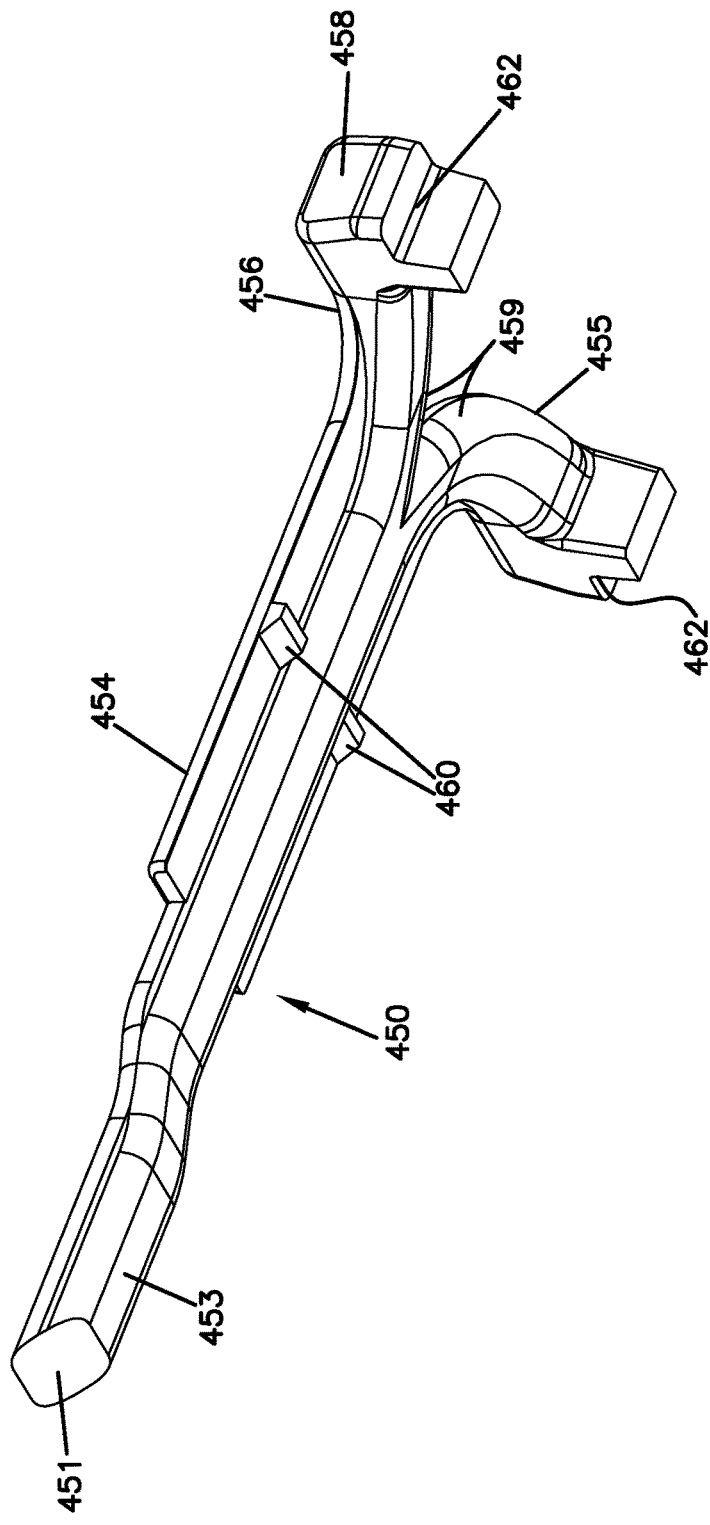
FIG. 13 is a bottom perspective view of the indication component of FIG. 8.

FIGS. 11-13 show how one example indication component 450 can be mounted to one example plug connector 400. The connector body 410 includes a retention arrangement 430 at which the indication component 450 is disposed. The retention arrangement 430 includes a channel 431 in which the first section 453 and intermediate section 454 can seat. The retention arrangement 430 also includes at least a first bridge 432 that extends over the channel 431. A portion of the indication component 450 extends under the first bridge 432 so that the first bridge 432 holds the indication component 450 to the connector body 410.

In certain implementations, the retention arrangement 430 also includes a second bridge 434. In some implementations, the first bridge 432 and the second bridge 434 extend over the intermediate section 434 of the indication component 450. In other implementations, the first bridge 432 extends at least partially over the arms 455, 456 of the indication component 450. In still other implementations, the second bridge extends over the first section 453. In certain implementations, the first bridge 432 is wider than the second bridge 434.

In some implementations, the retention arrangement 430 includes latch members 435 that extend upwardly from the connector body 410. For example, one or more latch members 435 can extend upwardly from the top 405 of the connector body 410. In certain implementations, the latch members 435 define a ramped surface facing towards the rear 402 of the connector body 410 and an engagement surface facing towards the front 401 of the body 410. The indication component 450 includes a corresponding set of latch teeth 460 that extend downwardly from a bottom of the indication component 450. The indication component 450 also defines notches 462 (FIG. 13) that align with notches 438 defined by the connector body 410. In the example shown, internal surfaces of the connector body 410 define the notches 438, which are sized and configured to receive notched portions 462 of the branch arms 455, 456 of the indication component 450.

To mount the indication component 450 to the connector body 410, the first end 451 of the indication component 450 is routed through the first and second bridge 432, 434 from the rear 402 of the body 410. The first section 453 and intermediate section 454 of the indication component 450 are slid along the channel 431 of the connector body 410 while the component 450 moves under the bridges 432, 434. As the indication component 450 slides forwardly, the latch teeth 460 of the component 450 cam over the ramped surfaces of the latch members 435 until they snap-over the latch members 435 and abut the engagement surfaces of the latch members 435. Accordingly, the latch members 435 lock the indication component 450 to the connector body 410.

FIGS. 14-17 illustrate various implementations of LC connectors having indication components. An LC connector includes a flexible latch 518 that is biased away from the connector. The latch 518 facilitates securing the LC connector to an adapter port. In certain implementations, the LC connector includes a trigger 519 that extends over part of the latch 518 to facilitate depressing the latch 518. In some implementations, the body of the LC connector is a single-piece housing in which a ferrule hub and spring mount. In other implementations, the body of the LC connector includes two housing pieces.

FIGS. 14 and 15 show one example LC connector 500 including a body 511, a ferrule hub 526, and a spring 529. The body 511 includes a front housing piece 512 and a rear housing piece 513. In the example shown, the latch 518 is disposed on the front housing piece 512 and the trigger 519 is disposed on the rear housing piece 513. The ferrule hub 526 includes a ferrule 527, a shoulder 533, and a spring mounting section 523. The ferrule hub 526 mounts in the front housing piece 512 so that a distal tip 528 of the ferrule 527 extends forwardly through an opening 521 in the front housing piece 512. A dust plug 532 can be mounted over the distal tip 528. The spring 529 seats around the spring mounting section 523 of the hub 526 so that a first end of the spring 529 abuts the shoulder 533 of the hub 526.

The rear housing piece 513 attaches to the front housing piece 512 to enclose the spring so that a second end of the spring 529 extends through an opening 522 and abuts an internal shoulder defined in the rear housing piece 513. In certain implementations, the front housing piece 512 defines openings 516 and the rear housing piece 513 defines a front extension 514 having protruding lugs 517 sized to fit in the openings 516 of the front housing piece 512. A cable retention section 531 extends rearwardly from the rear housing piece 513. The cable retention section 531 is configured to facilitate crimping or otherwise securing an optical cable to the rear housing piece 513.

In accordance with some aspects of the disclosure, the LC connector 500 can include an indication component 515. In some implementations, one or more parts of the LC connector 500 can be formed of a light transmissible material. For example, the rear housing piece 513 can be formed of a light transmissible material and function as the indication component 515. In such implementations, light from an LED (e.g., mounted within an adapter, mounted to a tray circuit board, etc.) can shine towards and illuminate at least portions of the rear housing piece 513. In other implementations, the front housing piece 512 can be formed of a light transmissible material and function as the indication component 515. In still other implementations, a light component, such as light component 450, can be disposed on the LC connector 500.

FIGS. 16 and 17 illustrate another example rear housing 550 suitable for use with the LC connector 500. The rear housing 550 includes a main body 554 on which the trigger 519 is disposed. A strain-relief boot 556 extends rearwardly from the main body 554. An optical cable 580 terminated by the LC connector can extend rearwardly through the boot 556. The main body 554, the trigger 519, and the boot 556 form a single piece configured to mount to a front LC housing (e.g., the front housing piece 512 of the LC connector 500 of FIGS. 14-15).

In some implementations, at least a portion of the rear housing 550 is formed from a light transmissible material. In such implementations, light from an LED (e.g., mounted within an adapter, mounted to a tray circuit board, etc.) can shine towards a bottom of the rear housing 550 and illuminate at least portions of the rear housing 550. In an example, main body 554 is formed from a light transmissible material. In another example, the boot 556 is formed from a light transmissible material. In another example, the main body 554 and the boot 556 are formed from a light transmissible material.

FIGS. 18-22 illustrate an example connector plug arrangement 600 having an indication component 650. The example connector plug arrangement 600 includes a body 610 having a front 601 and a rear 602. A ferrule 612 holding an optical fiber extends from the front 601 of the body 610. A strain-relief boot 616 couples to or extends from the rear 602 of the body 610.

In the example shown, the connector plug arrangement 600 is an SC connector. The body 610 includes a grip section 614 by which a user can grasp the plug connector 600 and a connection section 618 at which the plug connector 600 is secured to an optical adapter or other receptacle.

The indication component 650 is coupled to the plug connector body 610. The indication component 650 is configured to glow along a substantial portion of its body when illuminated. In some implementations, the indication component 650 is formed at least partially from a clear or translucent material (e.g., glass, plastic, etc.). The light traveling through the translucent material of the indication component 650 can be white light or colored light. In other implementations, the indication component 650 can be formed from a material tinted one or more colors, but sufficiently translucent to enable light to travel through the material.

In some implementations, the indication component 650 is disposed towards the rear 602 of the body 610. In certain examples, light directed to the indication component 650 at any point along the indication component 650 causes at least a substantial portion of the indication component 650 to glow. In an example, light directed towards one end of the illumination component 650 causes an opposite end of the illumination component to emit light.

Figure 20:
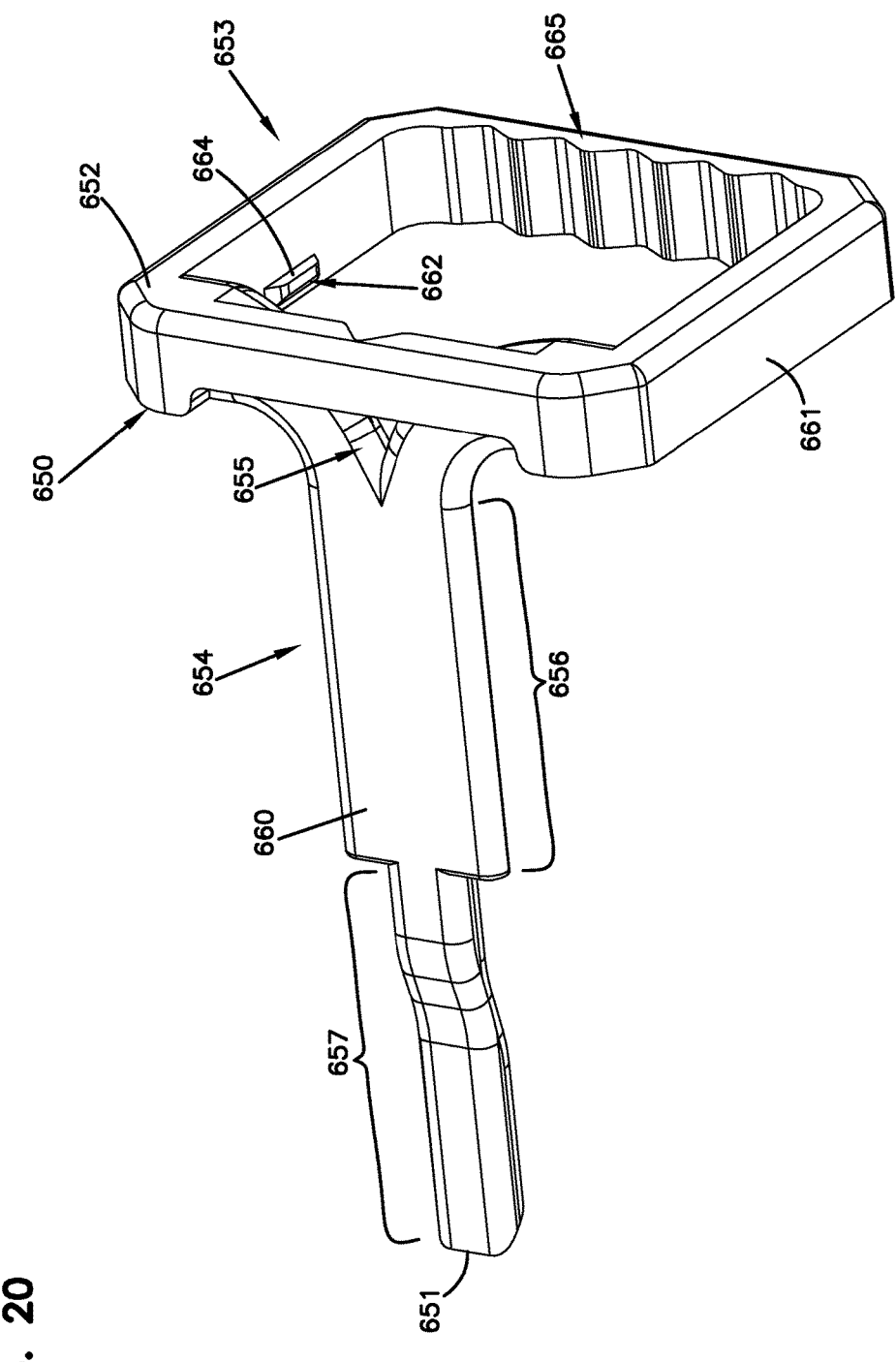
FIG. 20 is a top perspective view of the indication component of FIG. 18.
Figure 21:
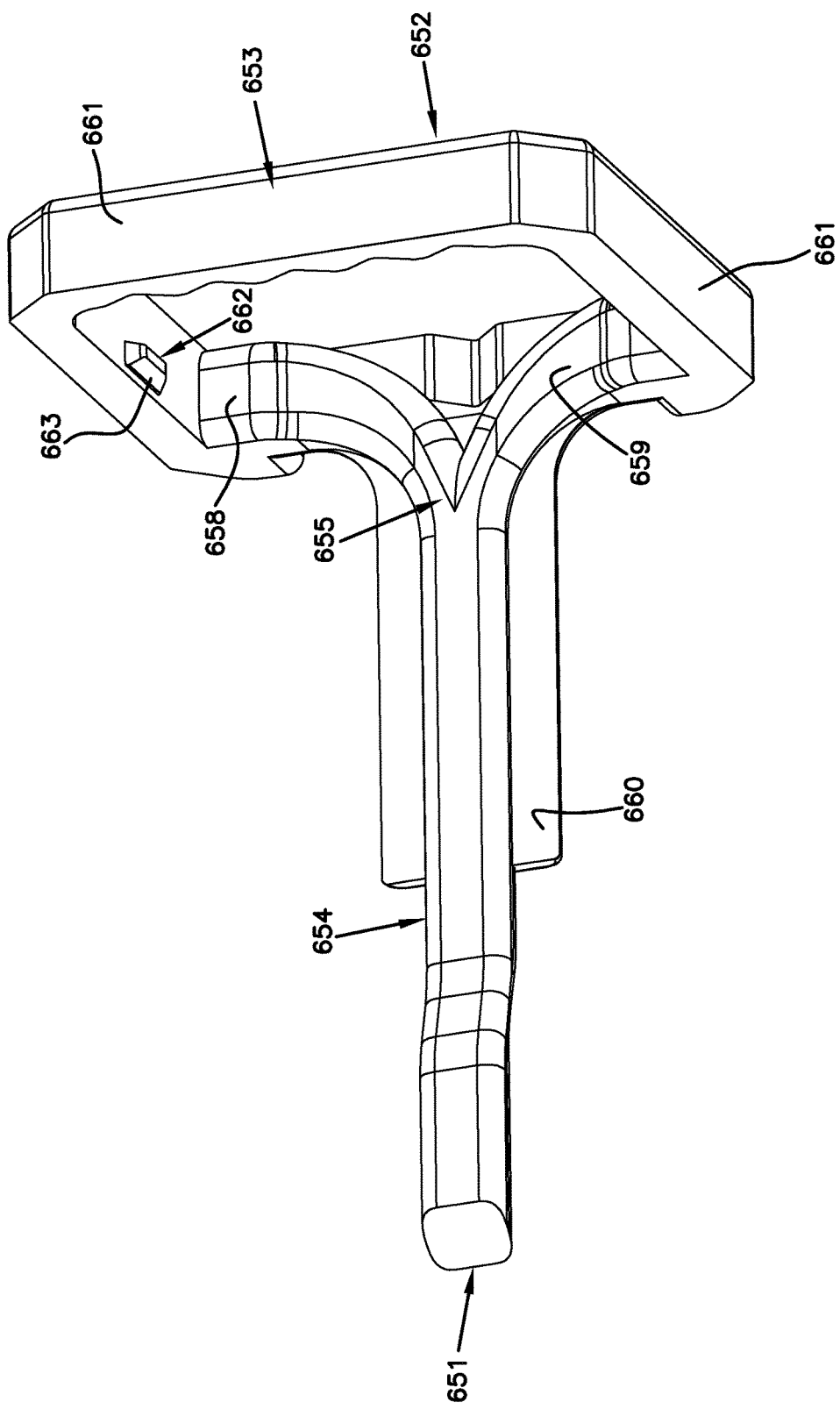
FIG. 21 is a bottom perspective view of the indication component of FIG. 18.

As shown in FIGS. 20 and 21, the indication component 650 extends from a first end 651 to a second end 652. The indication component 650 includes a wrap-around section 653 at the second end 652 and an extension section 654 extending from the warp-around section 653 to the first end 651. The wrap-around section 653 is configured to mount to the rear of the plug connector body 610. The wrap-around section 653 extends circumferentially along the connector body 610. The extension section 654 is configured to extend axially across part of the connector body 610. For example, the extension section 654 may extend through an open-ended slot 626 defined in the plug connector body 610 as will be described in more detail herein.

The extension section 654 is configured to direct light received at the extension section 654 to the wrap-around section 653. In some implementations, the extension section 654 defines a forked region 655 at the warp-around section 653. The forked region 655 is structured and configured to direct light in different (e.g., opposite) directions around the wrap-around section 653. In the example shown, the forked region 655 includes a first contoured section 658 and a second contoured section 659 the transition from the extension section 654 to the wrap-around section 653.

The indication component 650 includes one or more light emitting outer surfaces 660, 661 that are shaped and configured to enhance the amount of light visible to a user at those surfaces 660, 661 (i.e., to make the light more intensely visible). In an example, the light emitting outer surfaces 660, 661 are generally flat. In some implementations, the indication component 650 includes a first light emitting outer surface 660 extending along a portion of the extension section 654 and a second light emitting outer surface 661 extending around the wrap-around section 653.

In certain implementations, the first light emitting outer surface 660 extends along a first portion 656 of the extension section 654 and not along a second portion 657 of the extension section 654. In an example, the first portion 656 of the extension section 654 is configured to extend over or flush with an exterior of the plug connector body 610. The second portion 657 is configured to extend into a recess 626 defined in the plug connector body 610. In an example shown, the second portion 657 is contoured away from the generally flat surface of the first light emitting outer surface 660.

Figure 18:
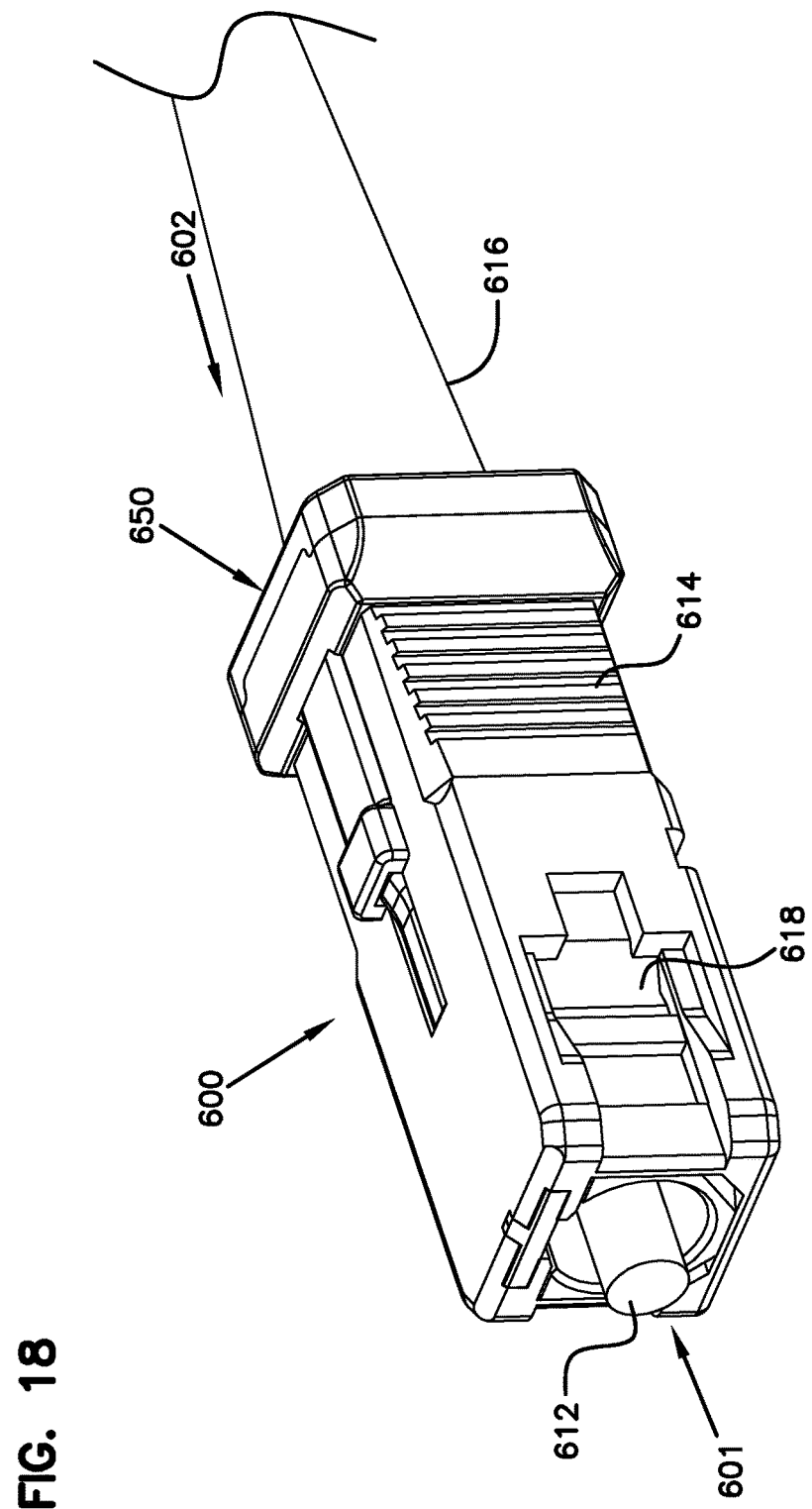
FIG. 18 is a front perspective view of an example Sc connector having an example indication component.
Figure 19:
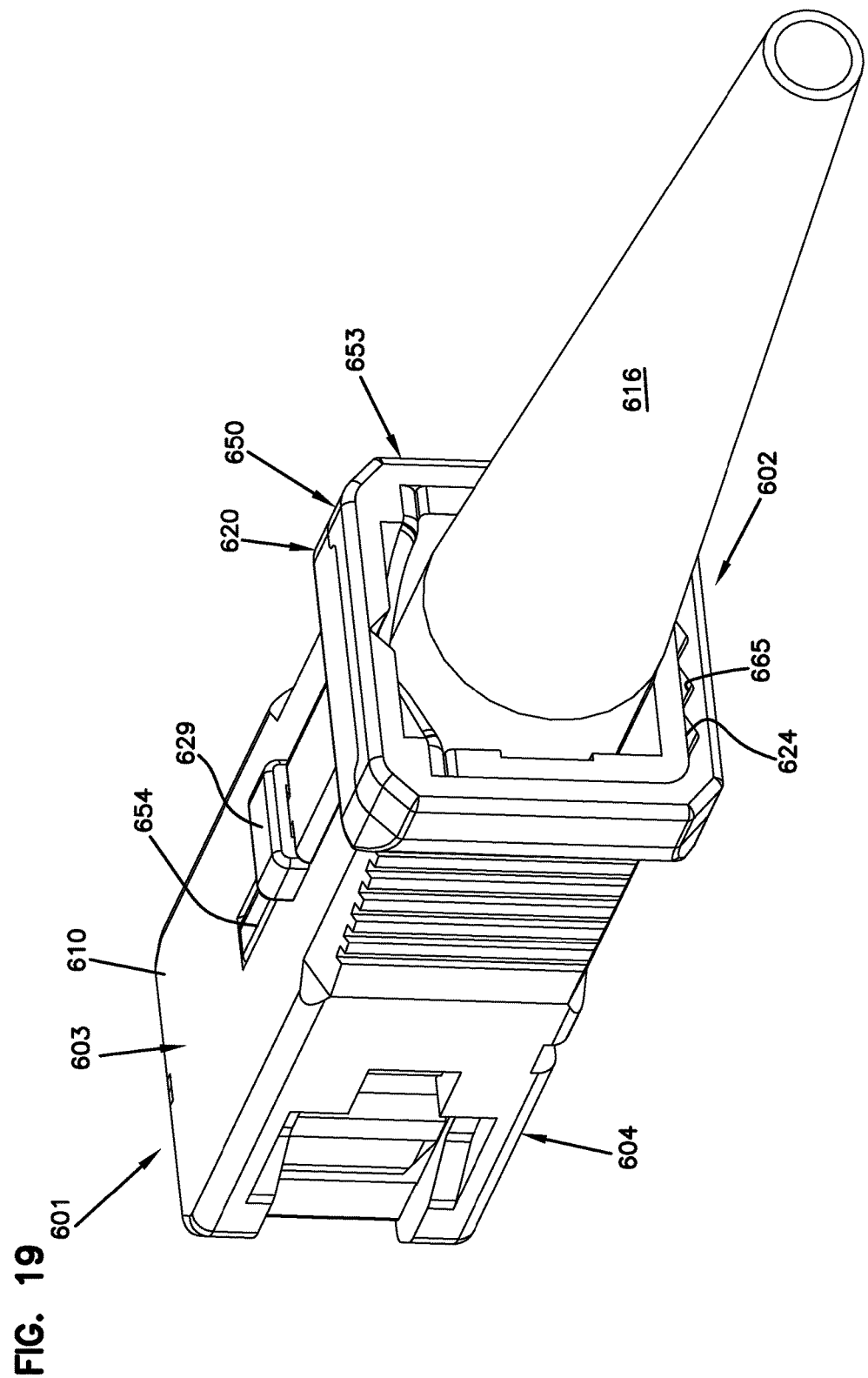
FIG. 19 is a rear perspective view of the SC connector of FIG. 18.

The wrap-around section 653 is sized and shaped to extend around a rear portion of the plug connector body 610 (see FIGS. 18 and 19). The second light emitting outer surface 661 defines a perimeter of the wrap-around section 653. In the example shown, the wrap-around section 653 has a generally rectangular shaped perimeter. In other implementations, however, the perimeter of the wrap-around section 653 can be generally round, elliptical, triangular, or any other desired shape. In certain implementations, the wrap-around section 653 can include a textured inner surface. For example, a bottom of the wrap-around section 653 can include a ridged section 665. In some implementations, the indication component 650 is configured to secure to the plug connector body 610. For example, the indication component 650 can include one or more retention members 662 that fit with one or more recesses 625 defined on the plug connector body 610. In certain examples, each retention member 662 includes a ramped surface 663 and a stop surface 664. In certain examples, each retention member 662 is disposed at an inner surface of the wrap-around section 653. In the example shown, two retention members 662 are disposed at opposite sides of the wrap-around section 653. In other implementations, the indication component 650 is otherwise secured to the plug connector body 610.

Figure 22:
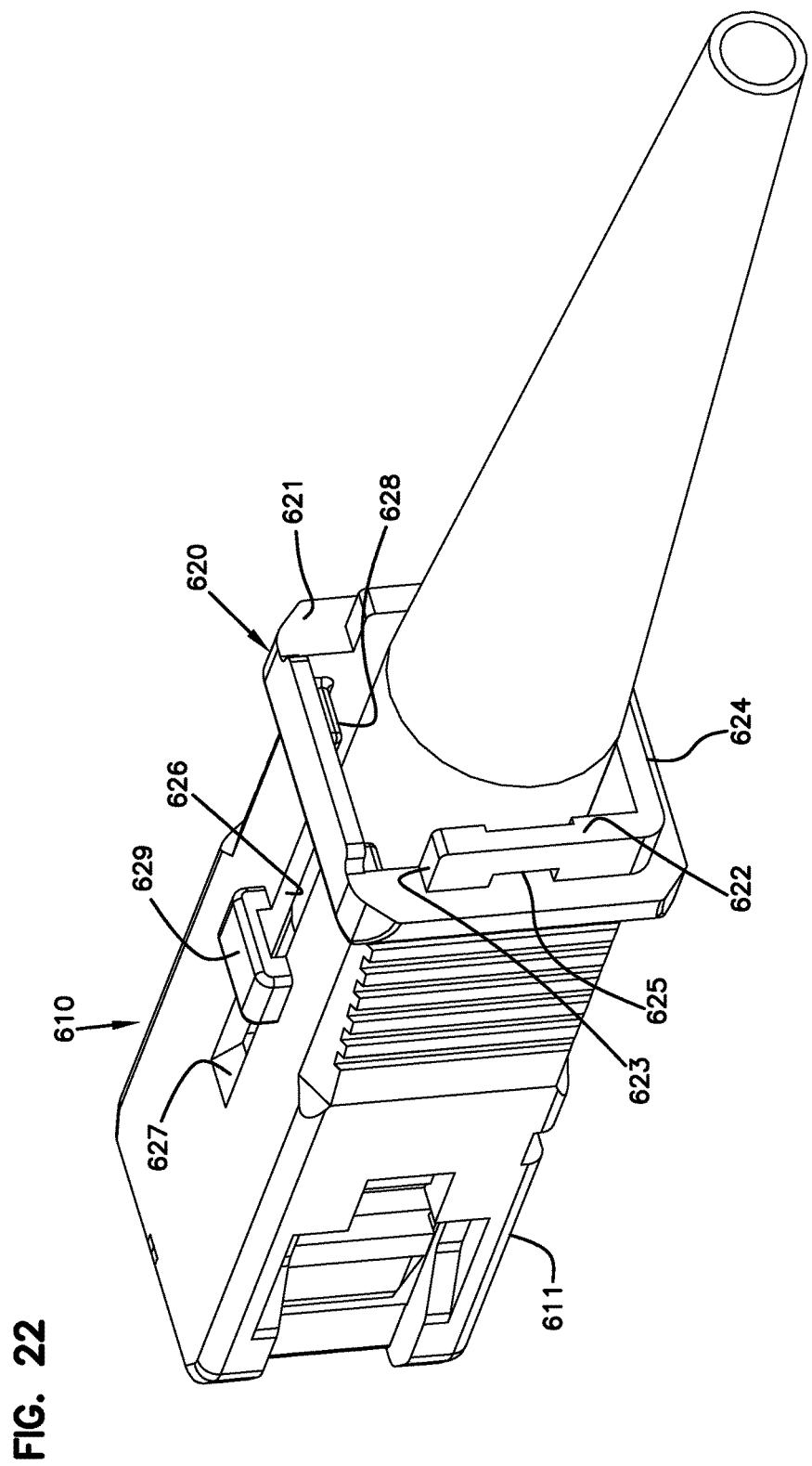
FIG. 22 is a rear perspective of the SC connector of FIG. 18 with the indication component removed.

As shown in FIG. 22, the plug connector body 610 includes a retention arrangement 620 at which the indication component 650 can be mounted. For example, the retention arrangement 620 can be located on a grip sleeve 611 of an SC connector. The retention arrangement 620 extends around the plug body 610 and defines a rearward surface 621 against which the wrap-around section 653 of the indication component 650 can be disposed. The retention arrangement 620 also includes a support flange 622 extending rearwardly from the rearward surface 621. The perimeter of the wrap-around section 653 extends around an outside of the support flange 622.

In some implementations, the support flange 622 extends less than fully around the perimeter of the retention arrangement 620. In certain implementations, the support flange 622 does not extend across one end 603 of the plug body 610. In certain implementations, the support flange 622 defines shoulders 623 facing towards the end 603 of the plug body 610. A portion of the indication component 650 seats on the shoulders 623 when the indication component 650 is coupled to the plug body 610. In certain examples, the forked sections 658, 659 seat on the shoulders 623. In certain implementations, the support flange 622 also defines a surface 624 that engages the ridged section 665 of the wrap-around section 653 (see FIG. 19).

The support flange 622 defines the recesses 625 in which the retention members 662 of the indication component 650 fit when the indication component 650 is coupled to the plug body 610. For example, sliding the indication component 650 forward over the plug connector body 610 from the rear of the plug connector body 610 causes the ramped surfaces 663 of the retention members 662 to engage the support flange 622, thereby flexing sides of the wrap-around section 653 outwardly to enable passage of the retention members 662 over the support flange 622. When the retention members 662 align with the recesses 625, the retention members 662 are biased into the recesses 625 by the wrap-around section 653. The shoulders 664 of the retention members 662 abut against the support flange 622 to inhibit rearward movement of the indication component 650 relative to the plug body 610.

In some implementations, one end 603 of the plug connector body 610 defines a slot 626 extending from a first end 627 to a second end 628. The first end 627 of the slot 626 is closer to the front 601 of the plug connector arrangement 600 and the second end 628 is disposed at the retention arrangement 620. In an example, the slot 626 extends through the retention arrangement 620 to define an open-ended second end 628. In an example, the first end 627 of the slot 626 is angled relative to the end 603 of the plug connector body 610. In certain implementations, a bridge member 629 extends over the slot 626 at the end 603 of the plug connector body 610.

The slot 626 is sized to receive the extension section 654 of the indication component 650. For example, the extension section 654 can extend from the wrap-around section 653, through the open end 628 of the slot 626, to the first end 327 of the slot 626. In certain implementations, the retention arrangement 620 of the plug connector body 610 extends over the indication component 650 at the open end 628 of the slot 626. In certain implementations, the slot 626 is sized to receive the extension section 654, but not the first light emitting outer surface 660. In an example, the first end 651 of the indication component 650 is angled to seat on the angled first end 627 of the slot 626.

The retention arrangement 620 and the bridge member 629 extend over the extension section 654 of the indication component 650 to inhibit non-axial removal of the extension section 654 from the slot 626. In certain implementations, the surface 621 of the support flange 622 and the bridge member 629 also inhibit continued forward movement of the indication component 650 relative to the plug connector body 610 when the first light emitting outer surface 660 engages the rear of the bridge member 629.

In some implementations, the indication component 650 is separately fabricated and subsequently fitted to the plug connector body 610. In other implementations, the indication component 650 can be fabricated directly onto the plug connector body 610. For example, the indication component 650 can be molded (e.g., overmolded, insert molded, 2K molded, etc.) to the plug connector body 610.

FIGS. 23-27 illustrate an example connector plug arrangement 700 having an example indication component 750. In the example shown, the connector plug arrangement 700 is an LC connector 700 including a front housing 710 and a rear housing arrangement 720 that cooperate to hold a spring-biased ferrule assembly 730. The rear housing arrangement includes a rear housing 721 and a tube member 722, which extends through an interior passage of the rear housing 721 (see FIG. 27). The tube member 722 is sufficiently long to extend rearwardly past the rear housing 721. A strain-relief device (e.g., a boot) 760 is coupled to a rear end of the tube member 722.

In some implementations, the indication component 750 is formed at least partially from a clear or translucent material (e.g., glass, plastic, etc.). The light traveling through the translucent material of the indication component 750 can be white light or colored light. In other implementations, the indication component 750 can be formed from a material tinted one or more colors, but sufficiently translucent to enable light to travel through the material.

The indication component 750 is coupled to the rear housing 721. For example, at least part of the indication component 750 can be disposed between the rear housing 721 and the strain-relief device 760. The indication component 750 includes a first portion 751 that defines a through-passage 752; and a second portion 753 that extends outwardly from the first portion 751 (see FIGS. 25 and 26). Light shown on the second portion 753 is directed towards the first portion 751 so that the indication component glows or is otherwise illuminated.

Figure 23:
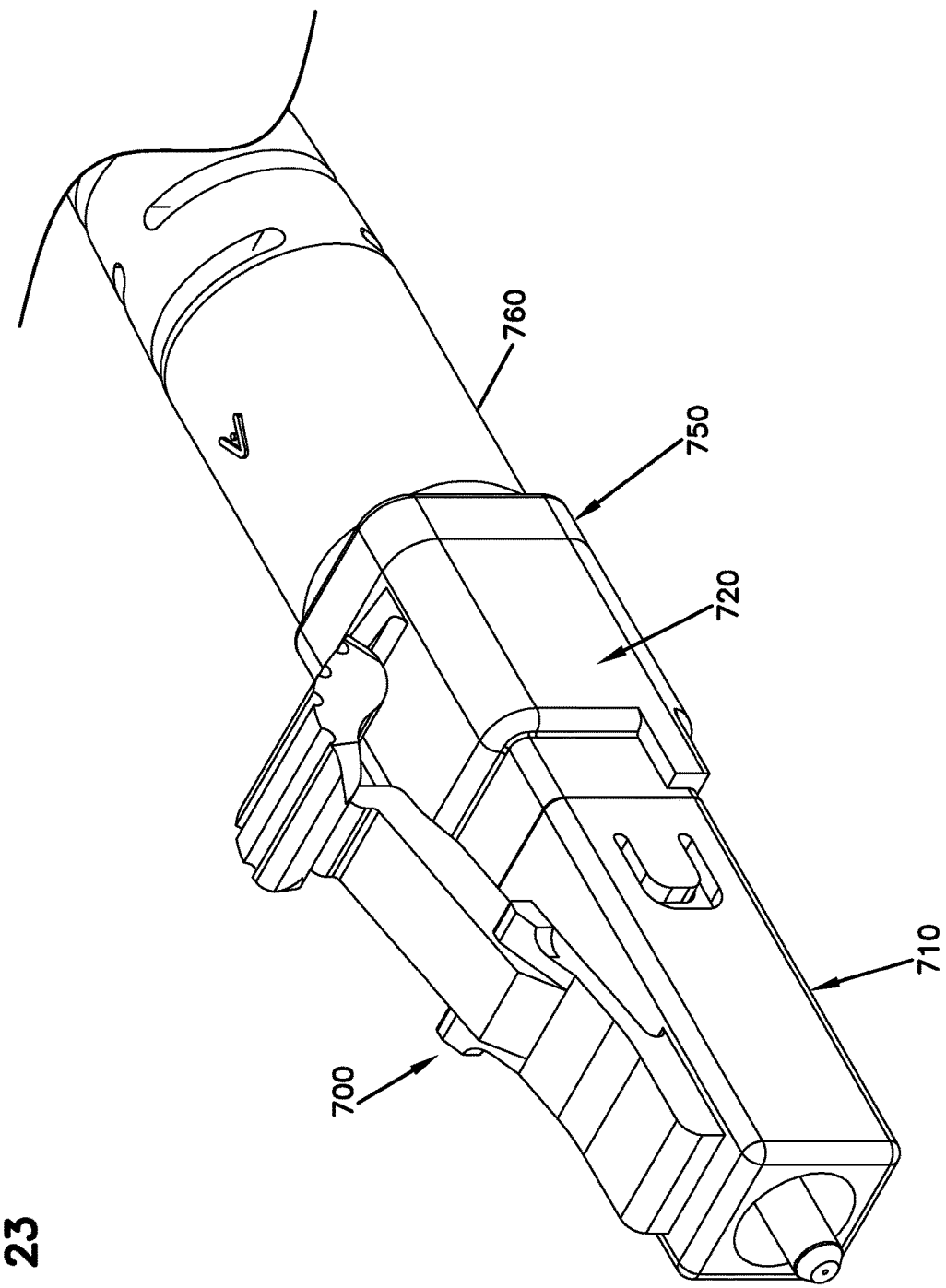
FIG. 23 is a front perspective view of an example LC connector having an indication component.
Figure 24:
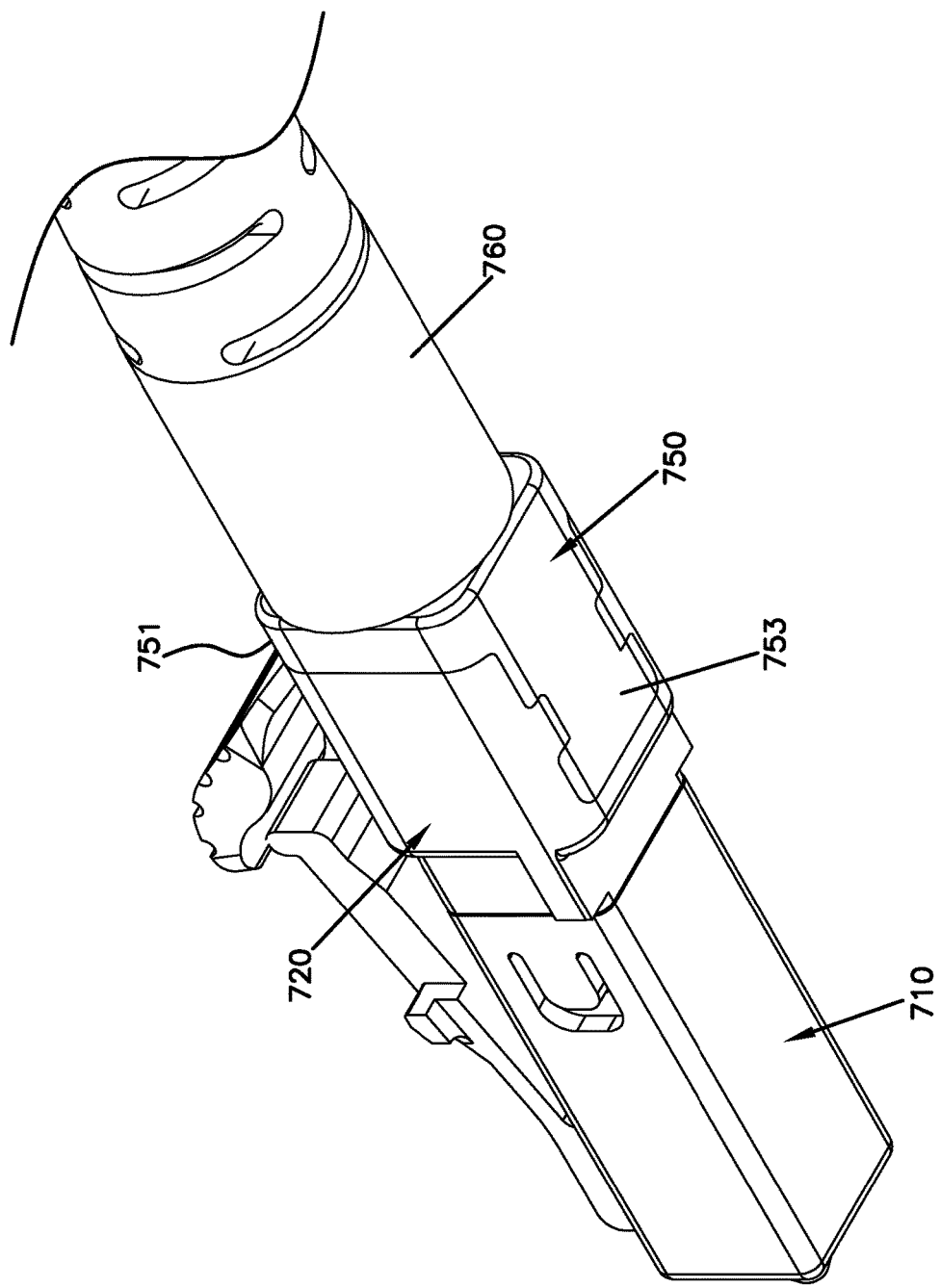
FIG. 24 is a rear perspective view of the LC connector of FIG. 23.

The first portion 751 extends circumferentially around the tube member 722 so that the tube member 722 extends through the through-passage 752 (FIG. 27). In some examples, the first portion 751 is rectangular in shape. In other examples, the first portion 751 is circular in shape. In certain implementations, the first portion 751 is shaped to match the rear housing 721. In an example, the first portion 751 is sized to be flush with the outer perimeter of the rear housing 721 when the indication component 750 is coupled to the rear housing 721 (FIGS. 23 and 27). In other implementations, the first portion 751 can be larger or smaller than the outer perimeter of the rear housing 721.

The second portion 753 of the indication component 750 is configured to extend axially over a portion of the rear housing 721. In some implementations, the rear housing 721 defines a pocket 725 in which the second portion 753 seats. In certain examples, the second portion 753 seats sufficiently far into the pocket 725 to be flush with an exterior surface of the rear housing 721 (see FIG. 24). In other implementations, the second portion 753 extends over an exterior surface of the rear housing 721. In the example shown, an outer surface of the second portion 753 is flat. In other implementations, however, the outer surface of the second portion 753 can be contoured. In other implementations, however, the outer surface of the second portion 753 can be textured.

In some implementations, a storage device 740 can be coupled to the LC connector 700. The storage device 740 can electronically store information (e.g., physical layer information) relating to the connector 700, the optical cable terminated by the connector 700, or related media. In some implementations, the storage device 740 includes a wireless (e.g., Radio-Frequency Identification) tag. In other implementations, other types of memory devices can be used.

In certain implementations, the indication component 750 can aid in mounting the storage device 740 to the connector 700. For example, the storage device 740 can be disposed between the rear housing 721 and the indication component 750. In certain implementations, the storage device 740 can be disposed within the pocket 725 defined in the rear housing 721. The second portion 753 of the indication component 750 extends across an open top of the pocket 725 when coupled to the rear housing 721 to close the pocket 725.

Figure 25:
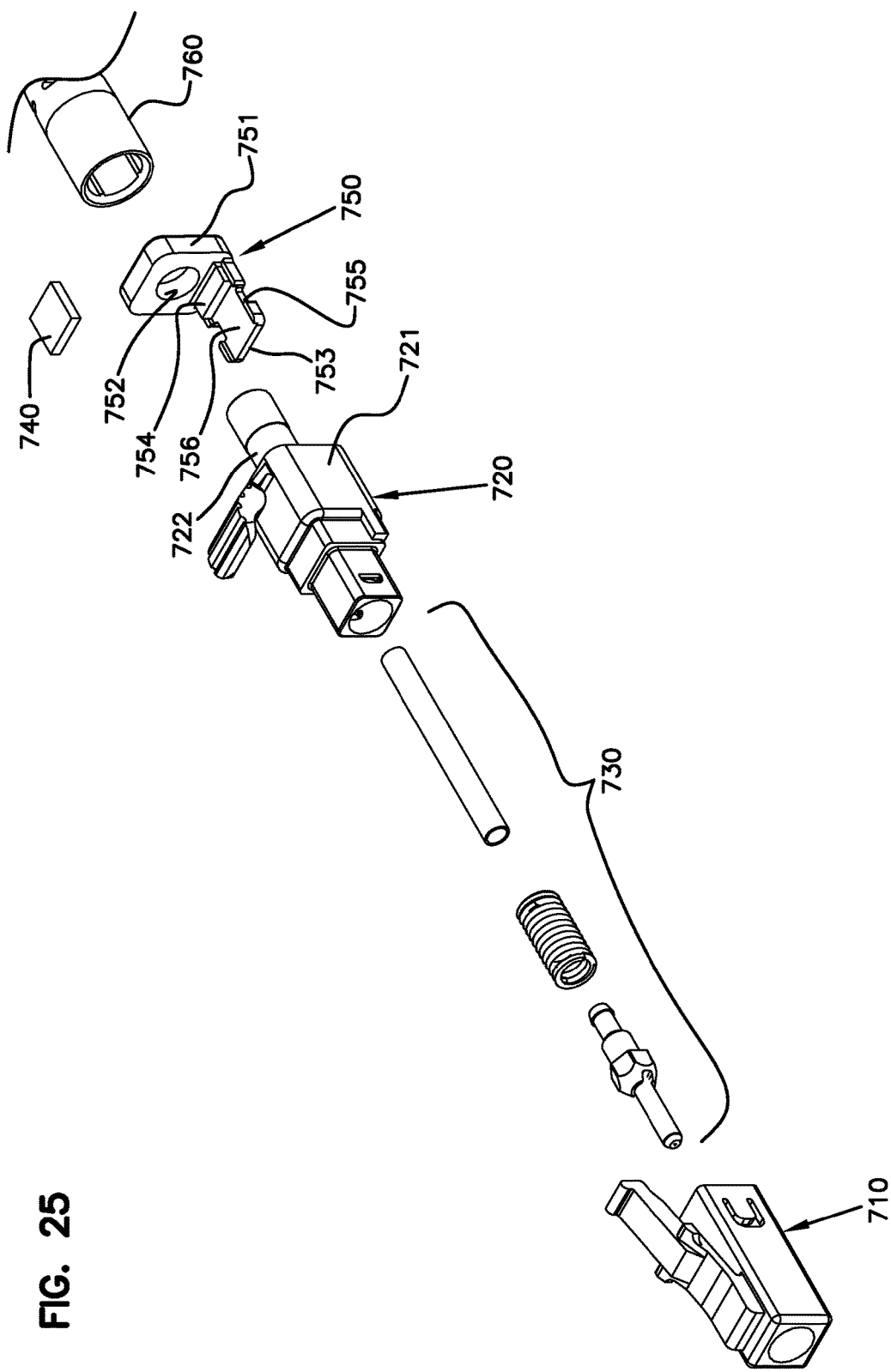
FIG. 25 is an exploded view of the LC connector of FIG. 23.
Figure 26:
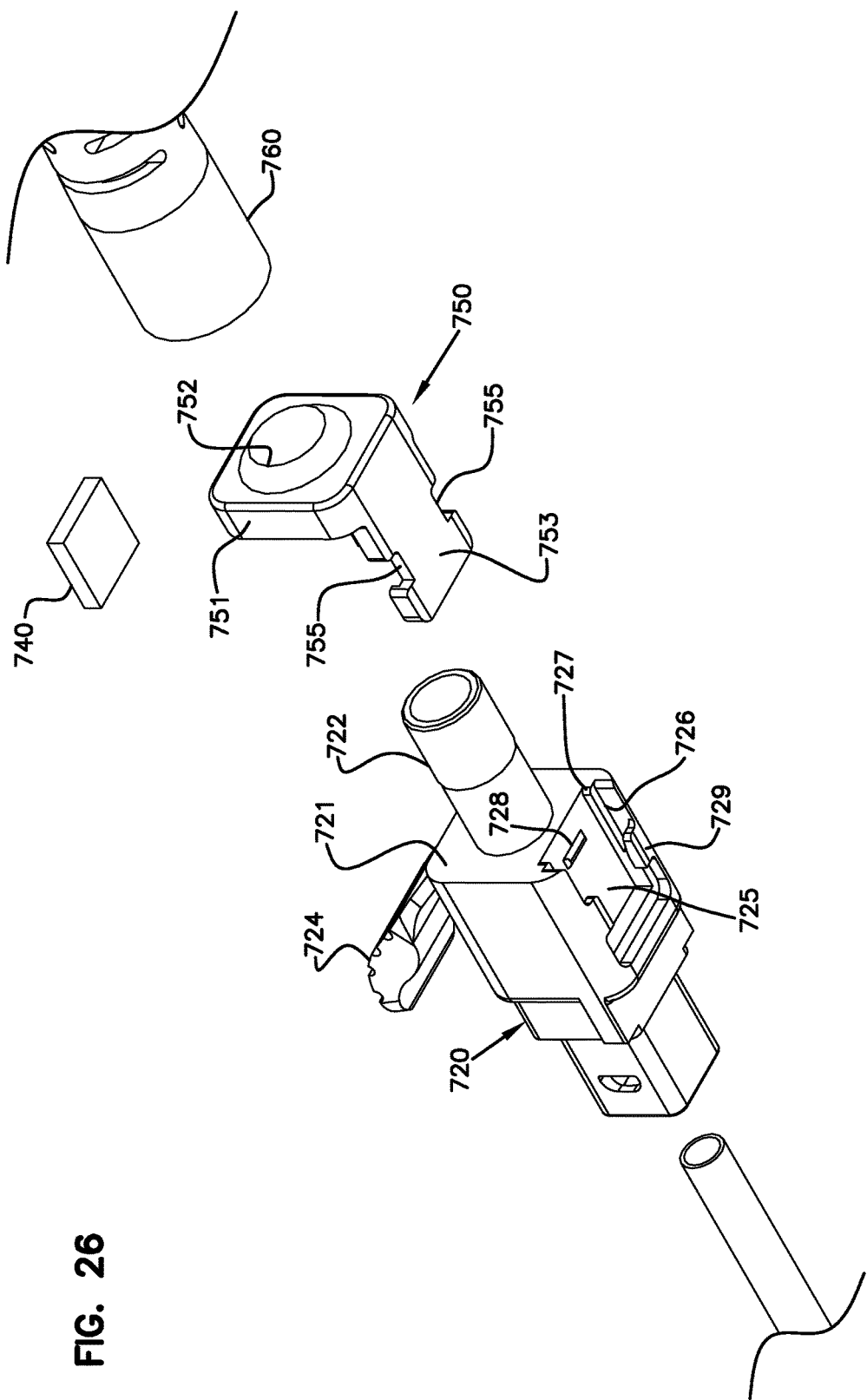
FIG. 26 is a bottom perspective view of the exploded LC connector of FIG. 25.

As shown in FIG. 25, the rear housing 721 defines a guide edge 726 around a perimeter of the pocket 725, except at an open end 727 of the pocket 725. The storage device 740 can slide into the pocket 725 through the open end 727 and seat on/against the guide edge 726. In certain implementations, a stop member 728 is disposed in the pocket 725 to aid in maintaining the storage device 740 within the pocket 725. The stop member 728 inhibits movement of the storage device 740 out of the pocket 725 through the open end 727. For example, the stop member 728 can be shaped and configured to enable the storage device 740 to snap-over the stop member 728. One or more tabs 729 extend inwardly from sides of the pocket 725 to maintain the storage device 740 within the pocket 725. For example, the tabs 729 inhibit movement of the storage device 740 out of the pocket 725 through the open top.

The second portion 753 of the indication component 750 defines an inner surface 756 that faces inwardly towards the rear housing 721 when the indication component 750 is coupled to the rear housing 721 (see FIG. 27). The inner surface 756 cooperates with the inwardly-extending tabs 729 to maintain the storage device 740 within the pocket 725 of the rear housing 721 (see FIG. 24). A support surface 754 is disposed on the inner surface 756 adjacent the first portion 751 of the indication component 750 (see FIG. 25). The support surface 754 also can aid in maintaining the position of the storage device 740 within the pocket 725 (see FIG. 27).

In some implementations, the indication component 750 is fabricated separately from the rear housing 721 and assembled to the rear housing 721. For example, the indication component 750 can be snap-fit, welded, adhered, or otherwise secured to the rear housing 721. In other implementations, the indication component 750 can be molded to the rear housing 721. For example, the indication component 750 can be overmolded, insert molded, and/or 2K molded to the rear housing 721. In certain implementations, the tube member 722 is configured to protect the optical fiber/cable during the molding process of the indication component 750.

The above specification and examples provide a complete description of the structure, manufacture, and use of the invention. Since many embodiments of the invention can be made without departing from the spirit and scope of the disclosure, the invention resides in the claims hereinafter appended.

LIST OF REFERENCE NUMERALS AND CORRESPONDING FEATURES 100 cable connection system
110 coupling housing
112 first port
120 printed circuit board
125 light source
125a, 125b, 125c example light sources
130 plug connector
132 communications media segment
135 indicator section
150 management system
152 processor
154 memory
156 operations
158 user interface
200 cable connection system
210 optical adapter
212 port
220 printed circuit board
225 light source
230 connector plug arrangement
232 optical fiber or fiber cable
234 main housing
235 indicator section
236 strain-relief boot
238 holding section
240 surface
242 recess
300 cable connection system
310 optical adapter
312 port
313 side wall
315 aperture
316 ferrule sleeve
320 printed circuit board
325 light source
330 connector plug arrangement
331 mounting section
333 depression
334 main housing
335 indicator section
336 strain-relief boot
337 first portion
339 second portion
339a latching nose
360 dust cap 362 cover portion
364 mounting portion
365 indicator section
366 enlarged diameter section
400 connector plug arrangement
401 front
402 rear
403 first side
404 second side
405 top
406 bottom
410 connector body
412 ferrule
414 grip section
416 boot
418 connection section
430 retention arrangement
431 channel
432 first bridge
433 recessed section
434 second bridge
435 latch members
438 notches
450 indication component
451 first end
452 second end
453 first section
454 intermediate section
455 first arm
456 second arm
457 distal end of first arm
458 distal end of second arm
459 intersection of arms
460 latch teeth
462 notches
500 LC connector
511 connector body
512 a front housing piece
513 a rear housing piece
514 front extension
516 openings
517 lugs
518 latch
519 trigger
521 opening
526 a ferrule hub
527 ferrule
528 distal tip
529 spring
531 cable retention section
532 dust plug
533 shoulder
550 rear housing piece
554 main body
556 boot
600 connector plug arrangement
601 front
602 rear
610 body
612 ferrule
614 grip section
616 strain-relief boot
618 connection section
620 retention arrangement
621 rearward surface
622 support flange
623 shoulder
624 surface
625 recesses
626 open-ended slot
627 first end
628 second end
629 bridge member
650 indication component
651 first end
652 second end
653 wrap-around section
654 extension section
655 forked region
656 first portion
657 second portion
658 first contoured section
659 second contoured section
660 first light emitting outer surface
661 second light emitting outer surface
662 retention member
663 ramped surface
664 stop surface
665 ridged section
700 connector plug arrangement
710 front housing
720 rear housing arrangement
721 rear housing
722 tube member
725 pocket
726 guide edge
727 open end
728 stop member
729 tabs
730 ferrule assembly
740 storage device
750 indication component
751 first portion
752 through-passage
753 second portion
754 support surface
756 inner surface
760 strain-relief device

What is claimed is:

1. A connector plug arrangement comprising:
a connector body that is configured to terminate a media segment, the connector body extending between a front and a rear, the connector body defining a pocket;
a storage device disposed within the pocket of the connector body; and
an indication component coupled to the connector body, the indication component being formed of a light transmissible material, the indication component having a first portion disposed at the rear of the connector body and a second portion extending across the pocket of the connector body to enclose the storage device within the pocket.

2. The connector plug arrangement of claim 1, wherein the media segment includes an optical fiber.

3. The connector plug arrangement of claim 1, wherein the media segment includes an electrical conductor.

4. The connector plug arrangement of claim 1, wherein the indication component is molded to the connector body.

5. The connector plug arrangement of claim 1, wherein at least part of the indication component is configured to fit flush with an outer perimeter of the connector body.

6. The connector plug arrangement of claim 1, wherein the indication component defines flat exterior surfaces that are illuminated when light is directed to the second portion of the indication component.

7. The connector plug arrangement of claim 6, wherein the flat exterior surfaces are illuminated when light is directed to any part of the indication component.

8. The connector plug arrangement of claim 1, wherein the light transmissible material is tinted one or more colors, but sufficiently translucent to enable light to travel through the light transmissible material.

9. The connector plug arrangement of claim 1, wherein the first portion of the indication component defines a through-passage.

10. The connector plug arrangement of claim 9, wherein the connector body extends through the through-passage.

11. The connector plug arrangement of claim 1, wherein the second portion cantilevers outwardly from the first portion.

12. The connector plug arrangement of claim 1, wherein the second portion of the indication component extends axially into the pocket of the connector body.

13. The connector plug arrangement of claim 1, wherein a tab extends inwardly from the perimeter and into the pocket.

14. The connector plug arrangement of claim 1, wherein the connector body includes a stop member disposed in the pocket to inhibit axial movement of the storage device relative to the pocket.

15. The connector plug arrangement of claim 1, wherein the second portion of the indication component includes a first section.

16. The connector plug arrangement of claim 1, wherein the indication component is fabricated separately from the connector body; and assembled to the connector body.

17. The connector plug arrangement of claim 1, further comprising a tube member extending into the connector body from the rear, the tube member being mounted over the media segment, the tube member also extending rearwardly from the rear of the connector body.

18. The connector plug arrangement of claim 1, further comprising a strain relief boot that abuts the indication component.

19. The connector plug arrangement of claim 1, wherein the storage device includes a wireless tag.

20. The connector plug arrangement of claim 19, wherein the storage device includes a Radio-Frequency Identification tag.

* * * * *